US012634637B2

(12) United States Patent
Ruan et al.

(10) Patent No.: US 12,634,637 B2
(45) Date of Patent: May 19, 2026

(54) SOUND CAPTURING METHOD, MICROPHONE, AND ELECTRONIC DEVICE

(71) Applicant: HUAWEI TECHNOLOGIES CO., LTD., Shenzhen (CN)

(72) Inventors: Shengjie Ruan, Shenzhen (CN); Sike Tan, Shenzhen (CN); Linxing Huang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 100 days.

(21) Appl. No.: 18/630,495

(22) Filed: Apr. 9, 2024

(65) Prior Publication Data

US 2024/0259735 A1 Aug. 1, 2024

Related U.S. Application Data

(63) Continuation of application No. PCT/CN2022/126904, filed on Oct. 24, 2022.

(30) Foreign Application Priority Data

Oct. 29, 2021 (CN) ......................... 202111276854.9

(51) Int. Cl.
*H03G 3/00* (2006.01)
*H04R 3/04* (2006.01)
(Continued)

(52) U.S. Cl.
CPC ............... *H04R 23/02* (2013.01); *H04R 3/04* (2013.01); *H04R 7/04* (2013.01); *H04R 23/008* (2013.01)

(58) Field of Classification Search
CPC ......... H04R 23/02; H04R 7/04; H04R 23/008
(Continued)

(56) References Cited

U.S. PATENT DOCUMENTS 10,190,870 B2 1/2019 Lacolle et al.
2011/0214479 A1* 9/2011 Kachanov ............ H01S 5/0656 73/24.02

(Continued)

FOREIGN PATENT DOCUMENTS

CN 109945964 A * 6/2019
CN 112470493 A 3/2021
CN 113194393 A 7/2021

OTHER PUBLICATIONS

Partial Supplementary European Search Report in European Appln. No. 22885837.9, mailed on Nov. 11, 2024, 45 pages.

(Continued)

*Primary Examiner* — Ammar T Hamid
(74) *Attorney, Agent, or Firm* — Fish & Richardson P.C.

(57) ABSTRACT

This disclosure provides methods and apparatuses related to a microphone. In an implementation, a microphone includes a laser self-mixing apparatus and a diaphragm apparatus, the diaphragm apparatus includes a membrane configured to respond to a sound vibration, and the laser self-mixing apparatus and the diaphragm apparatus are separately configured to detect a vibration of the membrane. In an example method performed by the microphone, a first voltage signal is obtained by using the laser self-mixing apparatus, and a second voltage signal is simultaneously obtained by using the diaphragm apparatus. If the first voltage signal is less than or equal to a preset threshold, the first voltage signal is converted into an audio signal; or if the first voltage signal is greater than the preset threshold, the second voltage signal is converted into an audio signal.

20 Claims, 13 Drawing Sheets

(51) Int. Cl.
*H04R 7/04* (2006.01)
*H04R 23/00* (2006.01)
*H04R 23/02* (2006.01)

(58) Field of Classification Search
USPC ........................................................ 381/98, 96
See application file for complete search history.

(56) References Cited

U.S. PATENT DOCUMENTS

| | | | | |
|---|---|---|---|---|
| 2012/0321100 | A1* | 12/2012 | Haila ..................... | H04R 3/005 381/92 |
| 2018/0233129 | A1* | 8/2018 | Bakish .................... | G10L 25/06 |
| 2018/0234761 | A1* | 8/2018 | Fishman ................ | H04R 3/005 |

OTHER PUBLICATIONS

International Search Report and Written Opinion in International Appin. No. PCT/CN2022/126904, mailed on Jan. 18, 2023, 18 pages (with English Translation).
Office Action in Japanese Appln. No. 2024-524464, mailed on Apr. 30, 2025, 11 pages (with English translation).

* cited by examiner

SOUND CAPTURING METHOD, MICROPHONE, AND ELECTRONIC DEVICE

CROSS-REFERENCE TO RELATED APPLICATIONS

This application is a continuation of International Application No. PCT/CN2022/126904, filed on Oct. 24, 2022, which claims priority to Chinese Patent Application No. 202111276854.9, filed on Oct. 29, 2021. The disclosures of the aforementioned applications are hereby incorporated by reference in their entireties.

TECHNICAL FIELD

This application relates to the field of electronic devices, and in particular, to a sound capturing method, a microphone, and an electronic device that uses the sound capturing method or includes the microphone.

BACKGROUND

There are a plurality of scenarios for an electronic device to use a microphone for sound pickup, for example, a call, a video call, a voice assistant, a remote conference, mass live streaming, and online teaching, in all of which the microphone is required to extract an audio signal. A signal-to-noise ratio of an existing microphone usually does not exceed 70 dB. However, as a use requirement is continuously higher, the signal-to-noise ratio of the microphone needs to be increased to 80 dB or more in some scenarios. As a result, it is difficult for the existing microphone to meet a performance requirement.

SUMMARY

This application provides a sound capturing method, to improve a sound pickup signal-to-noise ratio of a microphone. This application further relates to a microphone and an electronic device. Specifically, the following technical solutions are included.

According to a first aspect, this application provides a sound capturing method, applied to a microphone, where the microphone includes a laser self-mixing apparatus and a diaphragm apparatus, the diaphragm apparatus includes a membrane, the membrane is configured to respond to a sound vibration, and the laser self-mixing apparatus and the diaphragm apparatus are separately configured to detect a vibration of the membrane. The method includes:

- obtaining a first voltage signal by using the laser self-mixing apparatus, and simultaneously obtaining a second voltage signal by using the diaphragm apparatus; and
- if the first voltage signal is less than or equal to a preset threshold, converting the first voltage signal into an audio signal; or if the first voltage signal is greater than the preset threshold, converting the second voltage signal into an audio signal.

The sound capturing method in this application corresponds to the microphone that includes both the laser self-mixing apparatus and the diaphragm apparatus. The first voltage signal may be obtained by using the laser self-mixing apparatus, and the second voltage signal may be obtained by using the diaphragm apparatus. The first voltage signal and the second voltage signal are respectively signals obtained by the laser self-mixing apparatus and the diaphragm apparatus based on a response of the membrane to an external sound vibration. Then, the first voltage signal is compared with the preset threshold, to choose to convert the first voltage signal into the audio signal or convert the second voltage signal into the audio signal.

The laser self-mixing apparatus is relatively sensitive in detecting a sound vibration and can respond to a sound vibration with low sound pressure. As a result, a response range and a signal-to-noise ratio of the sound capturing method in this application are increased. In addition, an acoustic overload point of the diaphragm apparatus is relatively high. When the diaphragm apparatus is used in a scenario of a vibration with relatively high sound pressure, better sound capturing effect can be provided. Therefore, according to the sound capturing method, the preset threshold is set, so that the laser self-mixing apparatus and the diaphragm apparatus can complement each other, and collect the audio signals in respective operating scenarios that are relatively desirable, to ensure sound pickup effect of the sound capturing method in this application.

In a possible implementation, the laser self-mixing apparatus includes a transmitter and a receiver, and the obtaining a first voltage signal by using the laser self-mixing apparatus includes:

- controlling the transmitter to emit laser light toward the membrane;
- receiving, by using the receiver, laser light of the membrane, and forming a first current signal; and
- modulating the first current signal into the first voltage signal.

In this implementation, the laser self-mixing apparatus emits the laser light toward the membrane, and receives laser light formed through reflection performed by the membrane, to form the first current signal. The laser light reflected by the membrane may further form self-mixing interference effect with a part of laser light in a back cavity, to carry vibration information of the membrane, so that the first voltage signal into which the first current signal is converted can also carry the vibration information.

In a possible implementation, the laser self-mixing apparatus includes a transimpedance amplifier and an operational amplifier; and the modulating the first current signal into the first voltage signal includes:

- converting the first current signal into a first modulated voltage signal by using the transimpedance amplifier;
- amplifying the first modulated voltage signal by using the operational amplifier; and
- performing filtering on an amplified first modulated voltage signal to form the first voltage signal.

In this implementation, after the first current signal is converted into the first modulated voltage signal, the first modulated voltage signal includes high-frequency, medium-frequency, and low-frequency vibration information. Therefore, filtering is performed on the first modulated voltage signal, so that the high-frequency and low-frequency vibration information that are unnecessary can be filtered out. In addition, the first modulated voltage signal is amplified, so that strength of the first voltage signal can be increased. This facilitates subsequent conversion of the audio signal.

In a possible implementation, the diaphragm apparatus is provided with a diaphragm chip, and the obtaining a second voltage signal by using the diaphragm apparatus includes:

- collecting, by using the diaphragm chip, a strain signal formed by displacement of the membrane; and
- converting the strain signal into the second voltage signal.

In this implementation, the diaphragm apparatus senses the vibration of the membrane by using the diaphragm chip, then converts the displacement of the membrane into the strain signal, and forms the second voltage signal based on the strain signal.

In a possible implementation, converting the first voltage signal or the second voltage signal into the audio signal includes:

converting the first voltage signal or the second voltage signal into a digital signal format; and performing algorithm processing on the first voltage signal or second voltage signal converted into the digital signal format, to obtain the audio signal.

In this implementation, the first voltage signal and the second voltage signal that are obtained by a processing unit each are an analog signal. During processing of the first voltage signal or the second voltage signal into the audio signal, digital conversion needs to be first performed on the analog signal, to obtain a signal in the digital format and perform algorithm processing on the signal in the digital format.

In a possible implementation, the method further includes:

forming a control signal based on the first voltage signal, and outputting the control signal to the transmitter, where the control signal is used to adjust a wavelength of the laser light emitted toward the membrane.

In this implementation, the external sound vibration changes, and correspondingly, an optimal operating point of the laser self-mixing apparatus may change in a process in which the laser self-mixing apparatus collects the first voltage signal. A wavelength corresponding to the optimal operating point of the laser self-mixing apparatus may be obtained through calculation. Therefore, the wavelength of the laser light emitted by the transmitter toward the membrane is correspondingly adjusted, to ensure that the laser self-mixing apparatus always collects the first voltage signal at the optimal operating point.

In a possible implementation, the wavelength corresponding to the optimal operating point of the laser self-mixing apparatus is obtained through calculation based on a phase-locked loop algorithm.

In a possible implementation, the forming a control signal based on the first voltage signal, and outputting the control signal to the transmitter, to adjust a wavelength of the laser light emitted toward the membrane includes:

obtaining an optimal operating wavelength of the laser light through calculation based on the first voltage signal, to form the control signal; and controlling a magnitude of an operating current of the transmitter based on the control signal, to control the wavelength of the laser light emitted toward the membrane.

In a possible implementation, the obtaining an optimal operating wavelength of the laser light through calculation based on the first voltage signal, to form the control signal includes:

converting the first voltage signal from an analog format into the digital format; and obtaining the optimal operating wavelength of the laser light through calculation based on the first voltage signal in the digital format, to form the control signal.

In a possible implementation, the controlling a magnitude of an operating current of the transmitter based on the control signal, to control the wavelength of the laser light emitted toward the membrane includes:

converting the control signal from the digital format into the analog format; and controlling the magnitude of the operating current of the transmitter based on the control signal in the analog format, to control the wavelength of the laser light emitted by the transmitter toward the membrane.

In this implementation, the optimal operating point of the laser self-mixing apparatus is calculated based on the first voltage signal in the digital signal format. Therefore, before calculation, digital conversion needs to be performed on the first voltage signal in the analog format. Then, the optimal operating wavelength of the laser light of the laser self-mixing apparatus at the optimal operating point may be obtained through calculation based on the phase-locked loop algorithm or the like. Next, the magnitude of the operating current of the transmitter is controlled to control the wavelength of the laser light, so that the laser light emitted by the transmitter to the membrane is adjusted.

In a possible implementation, a feedback intensity C of the laser self-mixing apparatus is less than 1.

In this implementation, the feedback intensity C of the laser self-mixing apparatus is controlled to be less than 1. This can avoid a phase change or a noise fluctuation in the laser light received by the receiver, thereby ensuring quality of the laser light received by the receiver.

In a possible implementation, the preset threshold is 0.1 V.

In a possible implementation, the preset threshold is a voltage value of an audio signal corresponding to 94 dB to 100 dB.

In the foregoing two implementations, the preset threshold may be set to 0.1 V, or may be set to the voltage value of the audio signal corresponding to 94 dB to 100 dB. When the first voltage signal is equal to the preset threshold, a sound sensing capability of the laser self-mixing apparatus is relatively sensitive, and the laser self-mixing apparatus can accurately capture a distant sound vibration with low sound pressure. When the first voltage signal is greater than the preset threshold, the sound sensing capability of the laser self-mixing apparatus is compromised due to impact of noise. In this case, the diaphragm apparatus can better complete sound capturing.

According to a second aspect, this application provides an electronic device, where the electronic device includes a microphone, and the microphone performs sound pickup by using the sound capturing method according to the first aspect of this application.

It may be understood that, because the electronic device according to the second aspect of this application performs sound pickup by using the sound capturing method according to the first aspect of this application, the electronic device also collects an audio signal in two different manners and ensures quality of the audio signal by using a preset threshold.

According to a third aspect, this application provides a microphone, including a substrate, a protective cover, a laser self-mixing apparatus, a diaphragm apparatus, and a processing unit. The protective cover and the processing unit are both fastened to the substrate, the protective cover and the substrate form an inner cavity through enclosure, and the laser self-mixing apparatus and the diaphragm apparatus are fastened in the inner cavity and each are communicatively connected to the processing unit. The diaphragm apparatus includes a membrane and a back cavity, the back cavity is fastened to the substrate, the membrane is located on a side that is of the back cavity and that is away from the substrate, and the membrane and the back cavity form a sound pickup cavity through enclosure on the substrate. The laser self-mixing apparatus includes a transmitter and a receiver, the transmitter and the receiver are both accommodated in the sound pickup cavity and fastened to the substrate, the transmitter is configured to emit laser light toward the membrane, and the receiver is configured to receive laser light reflected by the membrane. The substrate is further provided with a plurality of sound pickup holes, and the sound pickup cavity communicates with the outside through the plurality of sound pickup holes.

In the microphone according to the second aspect of this application, the protective cover and the substrate form the inner cavity through enclosure, to accommodate the laser self-mixing apparatus and the diaphragm apparatus and protect the laser self-mixing apparatus and the diaphragm apparatus. The diaphragm apparatus further forms the sound pickup cavity in the inner cavity through enclosure with the substrate by using the membrane and the back cavity. The substrate is further provided with the sound pickup hole. An external sound vibration may enter the sound pickup cavity through the sound pickup hole and cause the membrane to vibrate. The diaphragm apparatus may identify the vibration of the membrane and form a second voltage signal. Then, the laser self-mixing apparatus is accommodated in the sound pickup cavity. By emitting the laser light toward the membrane, the laser self-mixing apparatus may receive laser light reflected back by the membrane and the back cavity together, and form a first voltage signal through sensing.

It may be understood that, the laser self-mixing apparatus and the diaphragm apparatus are both disposed in the microphone according to the third aspect of this application, so that the sound capturing method according to the first aspect can be applied to and implemented by the microphone according to the third aspect of this application. To be specific, the microphone in this application may obtain the first voltage signal and the second voltage signal by using the laser self-mixing apparatus and the diaphragm apparatus respectively, and convert the audio signal by using the preset threshold, so that the laser self-mixing apparatus and the diaphragm apparatus can complement each other, and collect the audio signals in respective operating scenarios that are relatively desirable, to ensure sound pickup effect of the microphone in this application.

In a possible implementation, the membrane includes a reflection unit, the reflection unit is located on a surface that is of the membrane and that faces the substrate, and the laser light emitted by the transmitter is received by the receiver after being reflected by the reflection unit.

In this implementation, the reflection unit is disposed on the surface that is of the membrane and that faces the substrate, so that the laser light emitted by the transmitter can be better reflected, to ensure that the receiver effectively receives the reflected laser light.

In a possible implementation, the reflection unit is located in a geometric center of the membrane, and the transmitter and the receiver on the substrate are located within a projection region of the reflection unit on the substrate.

In this implementation, the geometric center of the membrane is a region that is of the membrane and in which an amplitude is the largest. The reflection unit, the transmitter, and the receiver are all disposed in correspondence to the geometric center of the membrane, so that self-mixing efficiency of the reflected laser light can be improved. This helps extract vibration information.

In a possible implementation, a distance H between the reflection unit and the transmitter meets a condition: 20 um≤H≤100 um.

In this implementation, the distance between the reflection unit and the transmitter is limited, so that a reflection path of the laser light can be controlled, and the self-mixing efficiency of the laser light can be ensured.

In a possible implementation, the diaphragm apparatus includes a diaphragm chip, and the diaphragm chip is configured to: detect the vibration of the membrane, form the second voltage signal, and transmit the second voltage signal to the processing unit.

In this implementation, the diaphragm chip may convert displacement of the membrane into a strain signal, and finally form the second voltage signal and transmit the second voltage signal to the processing unit.

In a possible implementation, the membrane is a piezoelectric diaphragm or a piezoresistive diaphragm, and the diaphragm chip is a piezoelectric diaphragm chip or a piezoresistive diaphragm chip.

In this implementation, the diaphragm apparatus may be implemented by a piezoresistive diaphragm apparatus or a piezoelectric diaphragm apparatus, and the diaphragm chip is correspondingly the piezoresistive diaphragm chip or the piezoelectric diaphragm chip, so that reliable collection of the second voltage signal is implemented.

In a possible implementation, a thickness D of the membrane meets a condition: 0.1 um≤D≤1 um.

In this implementation, the thickness D of the membrane is controlled, so that a corresponding capability of the membrane for external sound can be ensured.

In a possible implementation, the membrane is provided with a barrier layer, the barrier layer is located on a side that is of the membrane and that faces the substrate, and the back cavity is fastened to the membrane through the barrier layer.

In this implementation, the barrier layer is connected between the back cavity and a main body of the membrane, so that insulation between the back cavity and the membrane can be implemented, and it can be ensured that the diaphragm chip reliably senses the vibration of the membrane and forms the second voltage signal.

In a possible implementation, the diaphragm chip is the piezoresistive diaphragm chip, a piezoresistive sensitive unit is disposed in a diaphragm, and the piezoresistive sensitive unit is configured to: sense the vibration of the membrane, and transmit a displacement signal of the membrane to the piezoresistive diaphragm chip.

In a possible implementation, the diaphragm chip is the piezoelectric diaphragm chip, the body of the membrane is made of a piezoelectric material, and a metal layer is disposed in the body of the membrane. The body is configured to: sense the vibration of the diaphragm and generate a charge. The metal layer collects the charge and transmits a charge signal to the piezoelectric diaphragm chip by using a transmission unit.

In the foregoing two implementations, operating principles of the diaphragm apparatus are different, and correspondingly, the diaphragm chip converts all received different signals into the second voltage signal, to implement sensing of the vibration of the membrane.

In a possible implementation, a residual stress of the membrane is less than or equal to 50 MPa.

In this implementation, the residual stress of the membrane is monitored, so that sensitivity of the membrane can be controlled.

In a possible implementation, the membrane is made of silicon or a silicon-containing compound.

In this implementation, the membrane is made of silicon or the silicon-containing compound, so that mechanical performance of the membrane can be ensured and fabrication is facilitated.

In a possible implementation, the membrane is provided with a penetrating balancing hole.

In this implementation, the balancing hole on the membrane penetrates between the sound pickup cavity and the inner cavity, so that air in the inner cavity can communicate with the outside through the balancing hole and the sound pickup hole in sequence. This ensures pressure balance between the inner cavity and the sound pickup cavity.

According to a fourth aspect, this application provides an electronic device, where the electronic device includes the microphone according to the third aspect, and the microphone is configured to collect an audio signal.

It may be understood that, because the electronic device according to the fourth aspect of this application includes the microphone according to the third aspect of this application for sound pickup, the electronic device also collects the audio signal in two different manners and ensures quality of the audio signal by using a preset threshold.

DESCRIPTION OF EMBODIMENTS

The following describes technical solutions in embodiments of this application with reference to the accompanying drawings in embodiments of this application. It is clear that the described embodiments are merely a part rather than all of embodiments of this application. All other embodiments obtained by a person of ordinary skill in the art based on embodiments of this application without creative efforts shall fall within the protection scope of this application.

Figure 1:
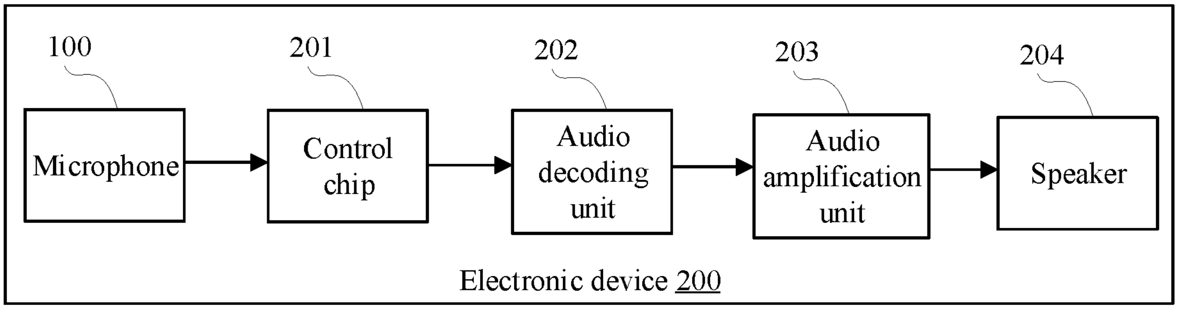
FIG. 1 is a schematic diagram of an internal framework of an electronic device according to this application.

FIG. 1 is a schematic diagram of an internal framework of an electronic device 200 according to this application.

As shown in FIG. 1, the electronic device 200 includes a control chip 201 and a microphone 100 that is provided in this application. The microphone 100 is electrically connected to the control chip 201, and the microphone 100 is configured to: sense an external sound vibration, form an audio signal, and transmit the audio signal to the control chip 201. After receiving the audio signal sensed by the microphone 100, the control chip 201 may send the audio signal to the outside, to implement a remote call function of the electronic device 200. It may be understood that the audio signal herein may also be understood as audio code, and the audio code may be sent to the outside in a form of a communication signal. The electronic device 200 according to this application may be a terminal product such as a mobile phone, a tablet, a notebook computer, a desktop computer, or a television. In some other embodiments, after receiving the audio signal sensed by the microphone 100, the control chip 201 may further parse out information, such as an instruction, included in the audio signal (code), to respond to a voice control operation of a user. The electronic device 200 according to this application may alternatively be the foregoing terminal product, a smart home appliance, or the like.

Figure 2:
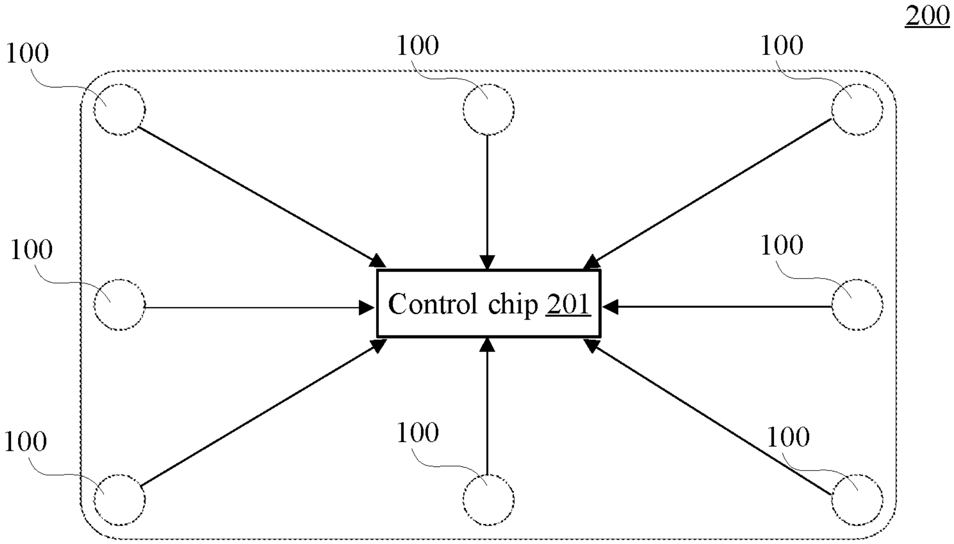
FIG. 2 is a schematic diagram of a structure of an electronic device according to this application.

As shown in FIG. 1, the electronic device 200 may further include an audio decoding unit 202, an audio amplification unit 203, and a speaker 204. The control chip 201 is at a back end of the microphone 100, and is further electrically connected to the audio decoding unit 202, the audio amplification unit 203, and the speaker 204 in sequence. After receiving the external sound vibration sensed by the microphone 100, the control chip 201 may send the audio signal to the speaker 204. The audio signal is played through the speaker 204 after being decoded and amplified in sequence. In this way, the electronic device 200 can implement, through sound capturing by the microphone 100, a function of voice interaction with the user. FIG. 2 is a schematic diagram of a structure of an electronic device 200 according to this application.

As shown in FIG. 2, eight microphones 100 are disposed in the electronic device 200. The microphones 100 are distributed at different orientations on outer edges of the electronic device 200, and are configured to capture sound vibrations from the different orientations of the electronic device 200. Each microphone 100 is electrically connected to a control chip 201, and is configured to transmit an audio signal. In some embodiments, the eight microphones 100 may be further numbered one by one. The control chip 201 may determine, based on audio signals received from the microphones 100 with different numbers, a location of the microphone 100, in the electronic device 200, that currently senses the audio signal, that is, determine an orientation of a sound source, relative to the electronic device 200, that currently emits a sound vibration, to implement a function of orientation identification.

In a subsequent audio signal processing process, the electronic device 200 may selectively receive, based on the determined orientation of the sound source relative to the electronic device 200, an audio signal captured by a microphone 100 in a region in the orientation, to implement a directional function of audio signal collection. In addition, when a plurality of microphones 100 respectively collect audio signals and transmit the audio signals to the control chip 201, the control chip 201 may further integrate the plurality of audio signals into one signal, and then send the signal to the outside or perform an operation such as voice interaction or instruction identification, to improve accuracy of sound vibration capturing by the electronic device 200. In some other embodiments, distribution and a quantity of microphones 100 in the electronic device 200 may alternatively be specified as required based on an actual use scenario. This is not particularly limited in this application.

Figure 3:
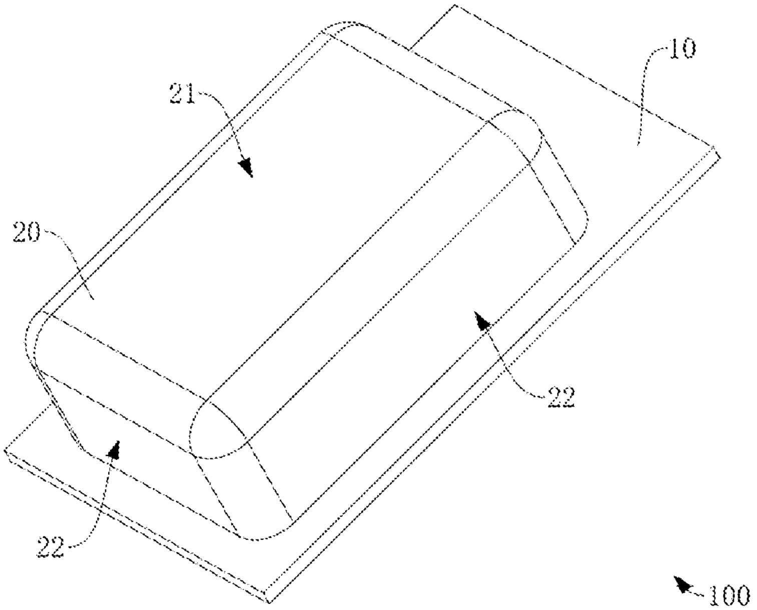
FIG. 3 is a schematic diagram of a structure of a microphone according to this application.

FIG. 3 is a schematic diagram of a structure of a microphone 100 according to this application.

The microphone 100 provided in this application includes a substrate 10 and a protective cover 20. The protective cover 20 includes a protective plate 21 and protective walls 22. The protective walls 22 are disposed around edges of the protective plate 21, and the protective walls 22 are further fastened to the substrate 10, so that the entire protective cover 20 is fastened to the substrate 10. The protective cover 20 and the substrate 10 form an inner cavity 23 (refer to FIG. 6) through enclosure.

Figure 4:
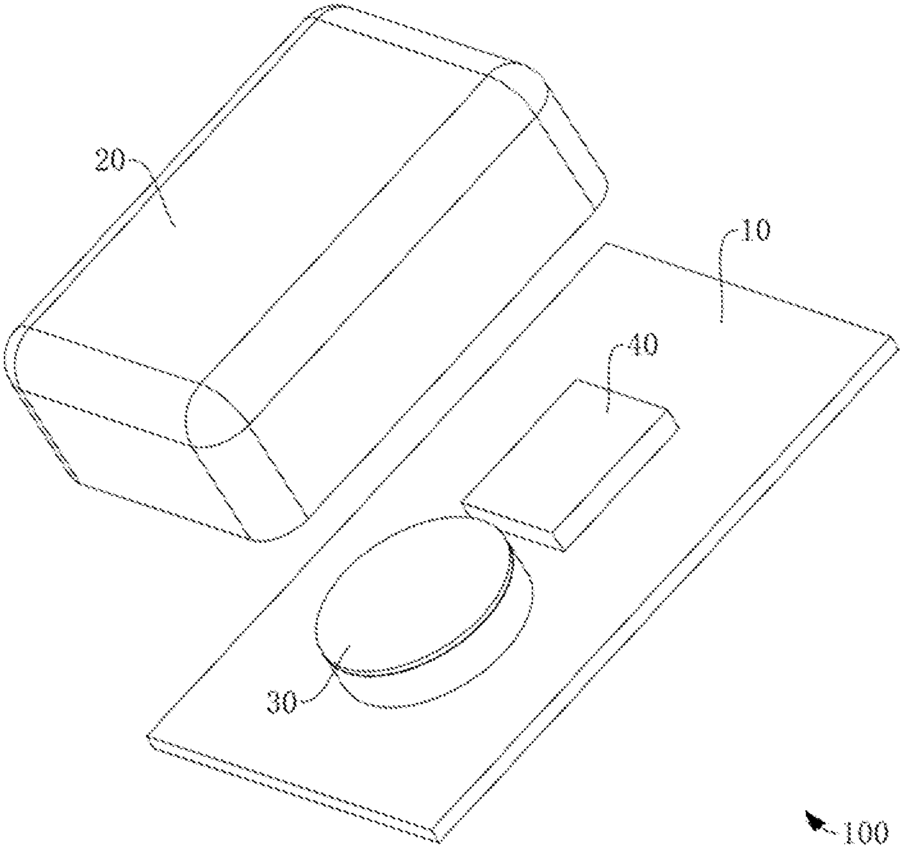
FIG. 4 is a schematic exploded view of a structure of a microphone according to this application.

FIG. 4 is a schematic exploded view of a structure of the microphone 100.

The microphone 100 further includes a diaphragm apparatus 30. The diaphragm apparatus 30 is accommodated in the inner cavity 23 formed through enclosure by the protective cover 20 and the substrate 10, and the diaphragm apparatus 30 is fastened to the substrate 10. As shown in FIG. 4, the microphone 100 further includes a processing unit 40, and the processing unit may be an application-specific integrated circuit (Application-Specific Integrated Circuit, ASIC). The processing unit 40 is also fastened to the substrate 10, and is also accommodated in the inner cavity 23. The processing unit 40 is fastened to the substrate 10, and the processing unit 40 is further electrically connected to the diaphragm apparatus 30. In some other embodiments, the processing unit 40 may alternatively be located outside the protective cover 20. In other words, the processing unit 40 may be located outside the inner cavity 23. In this case, the processing unit is still fastened to the substrate 10, and is electrically connected to the diaphragm apparatus 30.

Figure 5:
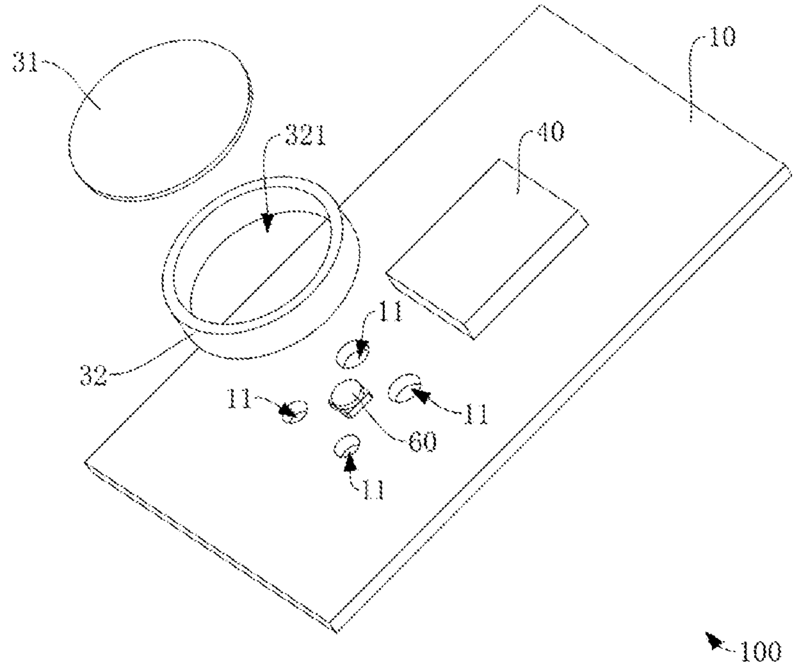
FIG. 5 is a schematic exploded view of a structure of a diaphragm apparatus in a microphone according to this application.

FIG. 5 is a schematic exploded view of a structure of the diaphragm apparatus 30.

The diaphragm apparatus 30 may be a micro-electromechanical system (Micro Electrical Mechanical System, MEMS), and includes a membrane 31 and a back cavity 32. The membrane 31 is in a shape of a thin film, and the membrane 31 may be made of silicon or a silicon-containing compound or may be made of a piezoelectric material in some embodiments. The back cavity 32 is in a shape of a hollow ring, and is provided with a penetrating through hole 321. As shown in FIG. 5, the back cavity 32 is circular, and correspondingly, the through hole 321 is specified to be circular, so that the back cavity 32 is in a shape of a hollow circular ring. In some other embodiments, the back cavity 32 may alternatively be rectangular, elliptical, or the like, and correspondingly, the through hole 321 is specified to be in a shape that matches a shape of the back cavity 32, so that the back cavity 32 is in a shape of a rectangular ring or an elliptical ring.

The membrane 31 is fastened to a side of the back cavity 32, and shields the through hole 321. A side that is of the back cavity 32 and that is away from the membrane 31 is fastened to the substrate 10, so that the diaphragm apparatus 30 and the substrate 10 form a sound pickup cavity 33 (refer to a sectional view of a structure of the inner cavity 23 in the microphone 100 shown in FIG. 6) through enclosure. It may be understood that the sound pickup cavity 33 is accommodated in the inner cavity 23. A region that is of the substrate 10 and that corresponds to the sound pickup cavity 33 is provided with at least one sound pickup hole 11. Specifically, as shown in FIG. 7, a projection of the through hole 321 of the back cavity 32 on the substrate 10 forms an accommodation region 322, and a plurality of sound pickup holes 11 are all located in the accommodation region 322. The at least one sound pickup hole 11 penetrates through the substrate 10, so that communication between the sound pickup cavity 33 and the outside is implemented. An external sound vibration may enter the sound pickup cavity 33 through each sound pickup hole 11, and cause the membrane 31 to vibrate. The diaphragm apparatus 30 may convert a displacement strain of the membrane 31 into an electrical signal, to collect and capture the external sound vibration, form an audio signal, and transmit the audio signal to the processing unit 40.

Shapes, sizes, and a quantity of the sound pickup holes 11 of the microphone 100 according to this application are not particularly limited. As shown in FIG. 7, there may be four sound pickup holes 11. In other embodiments, there may alternatively be another quantity of sound pickup holes 11. In addition, the shape and the size of the sound pickup hole 11 may be specified as required. Provided that the sound pickup hole 11 can communicate with the sound pickup cavity 33 and outer space, the external sound vibration is allowed to enter the sound pickup cavity 33 through the sound pickup hole 11.

Figure 8:
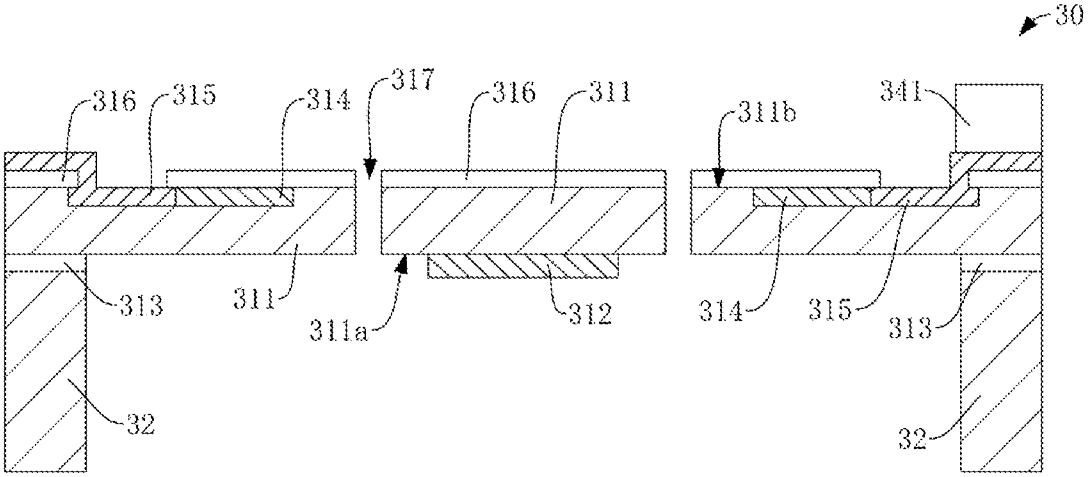
FIG. 8 is a schematic sectional view of a partial structure of a diaphragm apparatus in a microphone according to this application.
Figure 9:
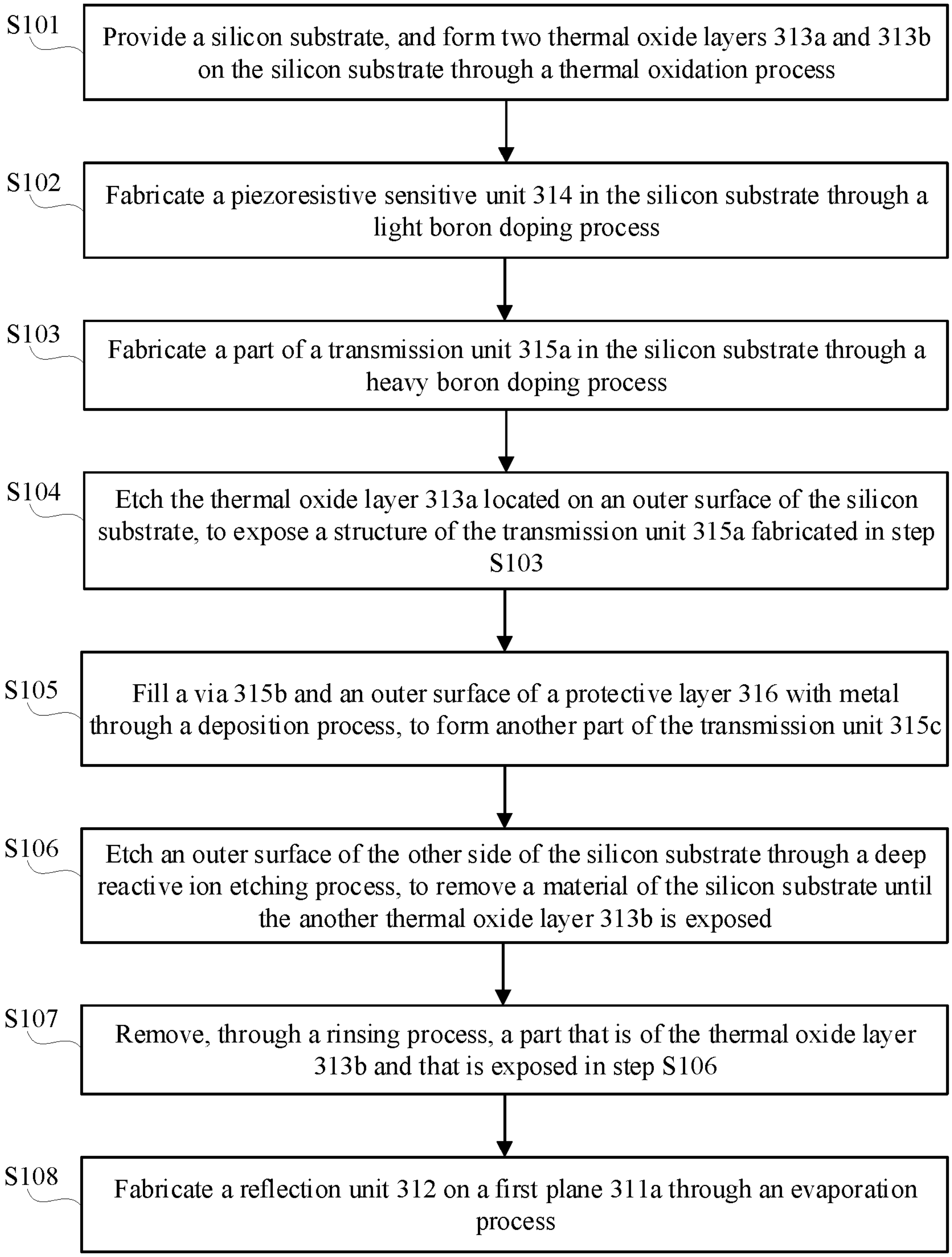
FIG. 9 is a schematic diagram of steps of a method for fabricating a diaphragm apparatus in a microphone according to this application.
Figure 10A:
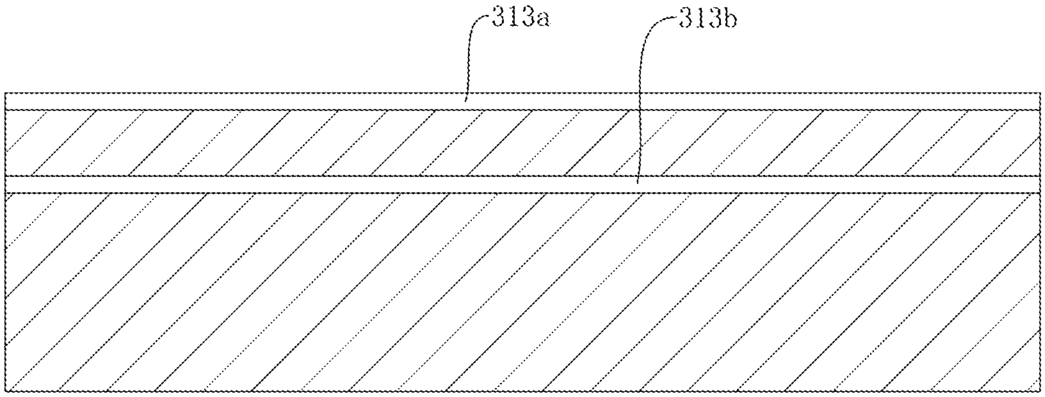
FIG. 10*a* to FIG. 10*h* each are a schematic diagram of a structure for each step of a method for fabricating a diaphragm apparatus in a microphone according to this application.
Figure 10B:
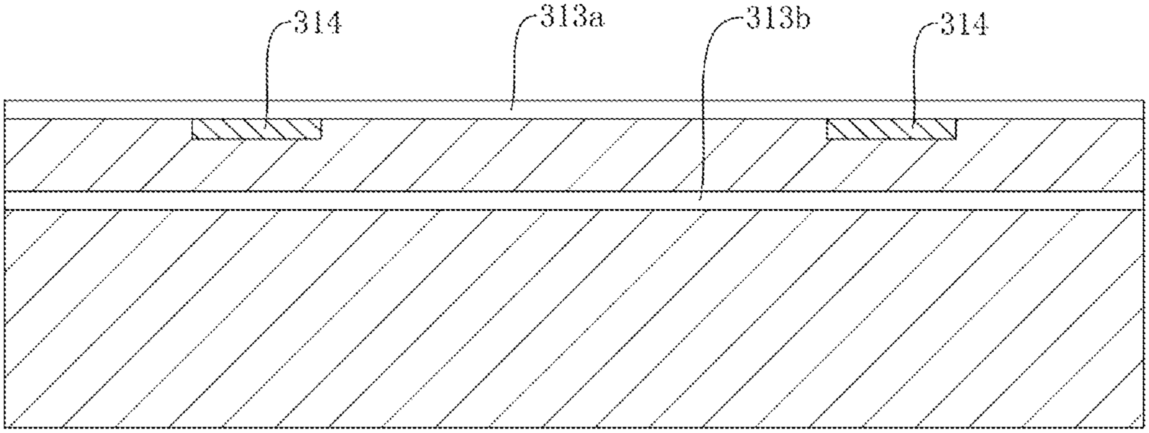
Figure 10C:
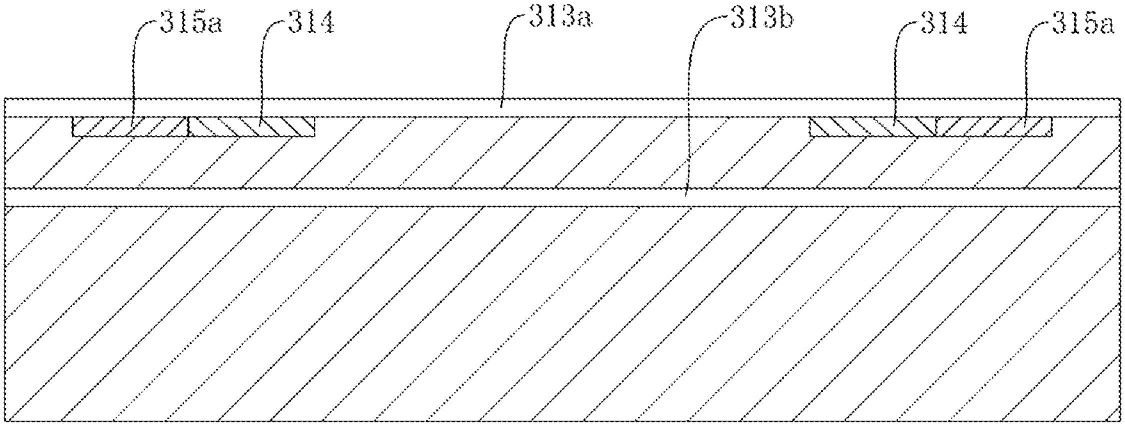
Figure 10D:
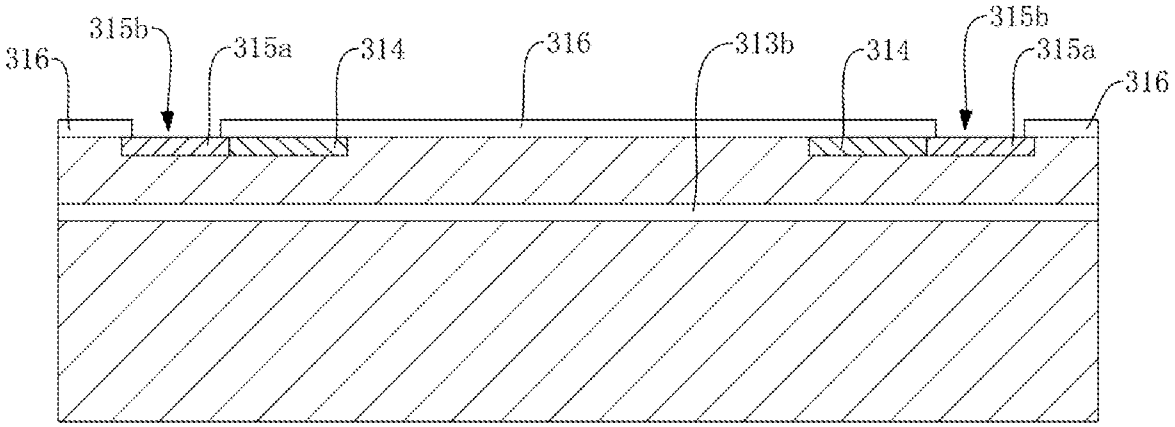
Figure 10E:
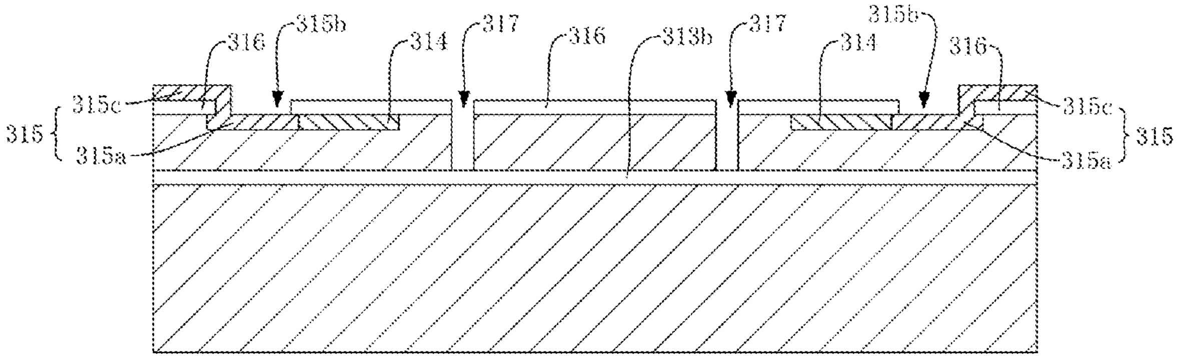
Figure 10F:
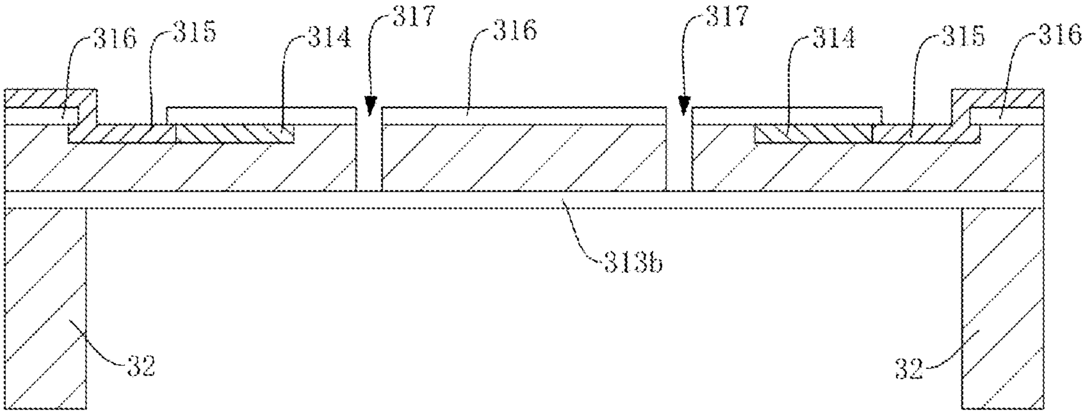
Figure 10G:
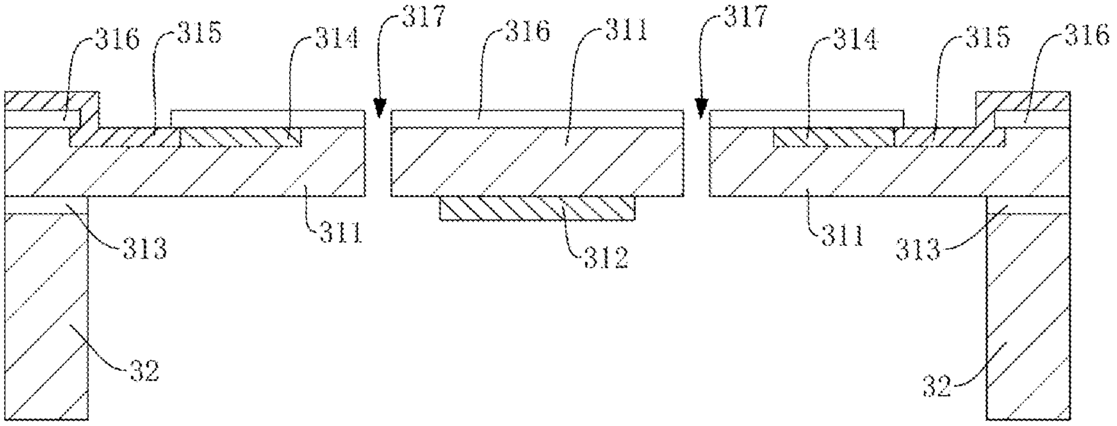
Figure 10H:
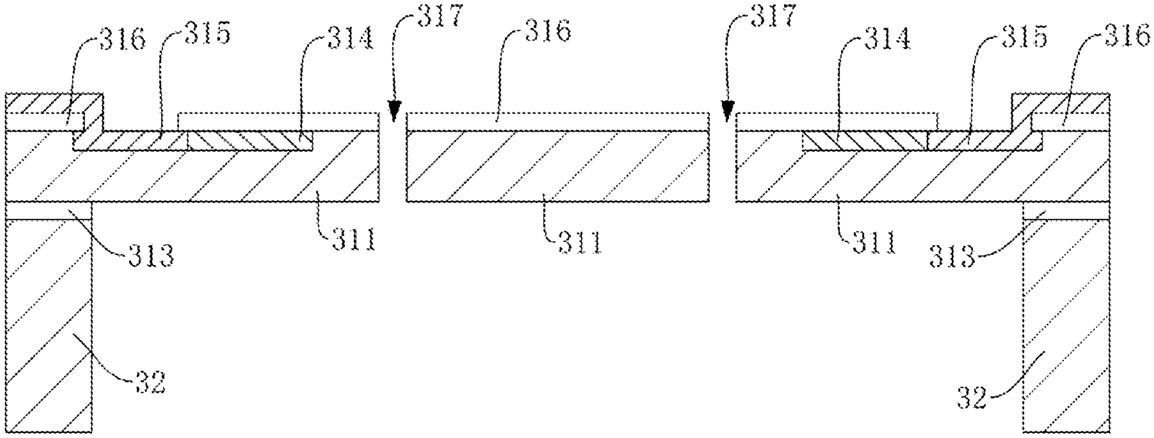

FIG. 8 shows an implementation of an inside of the diaphragm apparatus 30. In this implementation, the membrane 31 is implemented by a piezoresistive diaphragm. Specifically, the membrane 31 includes a body 311, a reflection unit 312, a barrier layer 313, piezoresistive sensitive units 314, transmission units 315, and a protective layer 316. The body 311 is made of silicon or a silicon-containing compound. The body 311 is in a shape of a thin film, and the body 311 has a first plane 311*a* and a second plane 311*b* that face away from each other. The first plane 311*a* is an outer surface of a side that is of the body 311 and that faces the substrate 10. The second plane 311*b* is an outer surface of a side that is of the body 311 and that is away from the substrate 10. A direction from the first plane 311*a* to the second plane 311*b* is a thickness direction of the body 311. A direction parallel to the first plane 311*a* and the second plane 311*b* is a plane direction of the body 311.

The barrier layer 313 is connected between the body 311 and the back cavity 32. That is, the barrier layer 313 is located on the first plane 311*a*. The barrier layer 313 is configured to: fasten the membrane 31 to the back cavity 32, and entirely insulate the membrane 31 from the back cavity 32. The reflection unit 312 is also located on the first plane. As shown in FIG. 8, the reflection unit 312 is further disposed at a location of a geometric center of the body 311. The reflection unit 312 faces an inside of the sound pickup cavity 33. The protective layer 316 is located on a side of the second plane 311*b*, and the protective layer 316 faces an outside of the sound pickup cavity 33. The protective layer 316 is configured to protect the body 311 and remaining composition structures of the membrane 31.

In the thickness direction of the body 311, the piezoresistive sensitive units 314 and the transmission units 315 are located between the reflection unit 312 and the protective layer 316. The piezoresistive sensitive units 314 are further distributed in the plane direction of the body 311. The piezoresistive sensitive unit 314 is configured to sense vibration displacement generated by the body 311. After the external sound vibration is transmitted to the sound pickup cavity 33 through the sound pickup hole 11, the body 311 is excited by the external sound vibration to generate the vibration displacement. The piezoresistive sensitive units 314 generate strain signals with the vibration displacement of the body 311, and transfer the strain signals backward through the transmission units 315 connected to the piezoresistive sensitive units 314. Further, the membrane 31 is provided with a piezoresistive diaphragm chip 341 in correspondence to the piezoresistive sensitive units 314. The piezoresistive diaphragm chip 341 may be disposed on the diaphragm apparatus 30, or may be integrated into the processing unit 40. The piezoresistive diaphragm chip 341 is electrically connected to the piezoresistive sensitive unit 314, and is configured to: convert strain signals sensed by the piezoresistive sensitive unit 314 into one voltage signal (which is specifically a second voltage signal V2), and transmit the voltage signal to the processing unit 40.

It may be understood that, when the piezoresistive diaphragm chip 341 is disposed on the diaphragm apparatus 30, and is specifically disposed on the second plane 311*b* of the membrane 31, the piezoresistive diaphragm chip 341 may be electrically connected to the piezoresistive sensitive units 314 directly through the transmission units 315, and collect the strain signals. When the piezoresistive diaphragm chip 341 is integrated into the processing unit 40, the piezoresistive diaphragm chip 341 needs mating between the transmission units 315 and a transmission line 319, to be connected to the piezoresistive sensitive units 314. The foregoing two manners of disposing the piezoresistive diaphragm chip 341 can both implement the connection between the piezoresistive diaphragm chip 341 and the piezoresistive sensitive units 314, and cause the piezoresistive diaphragm chip 341 to collect the strain signals.

An overall thickness of the membrane 31 in this embodiment may range between 0.1 um and 1 um, for example, may have a value of 0.9 um, so that a capability of the membrane 31 in responding to sound pressure of the external sound vibration and displacement sensitivity of the membrane 31 are ensured. An area of the membrane 31 ranges between 0.3 $mm^2$ and 4 $mm^2$, for example, is 1 $mm^2$. In this case, a smaller side length of a single side of the membrane 31 indicates a larger high-frequency range covered by the membrane 31, and a longer side length of the single side indicates relatively high sensitivity of the membrane 31. This may be specifically adjusted based on an actual application scenario. A residual stress of the membrane 31 does not exceed 50 MPa, so that sensitivity of the membrane 31 is ensured.

A shape of the reflection unit 312 may be a circle, and a radius of the reflection unit 312 ranges between 10 um and 1000 um, for example, has a value of 60 um, so that a relatively large reflection area is obtained. A thickness of the reflection unit 312 may range between 10 nm and 200 nm, so that a light reflection capability is ensured. Further, a distance between a geometric center of the reflection unit 312 and the geometric center of the body 311 needs to be controlled within 10 um.

A thickness of the piezoresistive sensitive unit 314 may range between 100 nm and 500 nm, for example, may be 180 nm, to reach a preset resistance value, so that the strain signal is collected.

A thickness of the protective layer 316 ranges between 50 nm and 1000 nm, for example, 200 nm, to ensure protection effect.

In an embodiment, the membrane 31 is further provided with a balancing hole 317. The balancing hole 317 penetrates through the membrane 31 in the thickness direction of the membrane 31, and the balancing hole 317 communicates with the sound pickup cavity 33 and the inner cavity 23. After the external sound vibration enters the sound pickup cavity 33 through the sound pickup hole 11, atmospheric pressure in the sound pickup cavity 33 may change. As a result, the membrane 31 forms a pressure difference between the sound pickup cavity 33 and the inner cavity 23, which may cause interference to the vibration of the membrane 31. The balancing hole 317 is provided to balance pressure in the sound pickup cavity 33 and the inner cavity 23, to ensure vibration effect of the membrane 31. A diameter of the balancing hole 317 may range between 0.5 um and 5 um, for example, 1.5 um.

In the embodiment in which the piezoresistive diaphragm chip 341 is disposed on the membrane 31, a structure of the piezoresistive diaphragm chip 341 further needs to be limited, to prevent the piezoresistive diaphragm chip 341 from affecting the vibration effect of the membrane 31. In an embodiment, a shape of the piezoresistive diaphragm chip 341 is a rectangle, and a side length combination of the piezoresistive diaphragm chip 341 may range from 0.5 mm×0.5 mm to 5 mm×5 mm, for example, may be 1.4 mm×1.4 mm. A thickness of the piezoresistive diaphragm chip 341 may range between 150 um and 500 um, for example, 220 um.

FIG. 9 and FIG. 10*a* to FIG. 10*h* show steps of a method for fabricating the diaphragm apparatus 30 according to this application. The diaphragm apparatus 30 according to this application may be expanded and obtained through the following steps.

S101: Provide a silicon substrate, and form two thermal oxide layers 313*a* and 313*b* on the silicon substrate through a thermal oxidation process (refer to FIG. 10*a*).

One thermal oxide layer 313*a* is located on an outer surface of one side of the silicon substrate, and the another thermal oxide layer 313*b* is located inside the silicon substrate and is spaced from the thermal oxide layer 313*a* on the outer surface.

S102: Fabricate a piezoresistive sensitive unit 314 in the silicon substrate through a light boron doping process (refer to FIG. 10*b*).

The piezoresistive sensitive unit 314 is located between the two thermal oxide layers 313*a* and 313*b*, and is patterned synchronously in a process of fabricating the piezoresistive sensitive unit 314.

S103: Fabricate a part of a transmission unit 315*a* in the silicon substrate through a heavy boron doping process (refer to FIG. 10*c*).

A depth of the part of the transmission unit 315*a* in the silicon substrate is equal to a depth of the piezoresistive sensitive unit 314 in the silicon substrate, so that the part of the transmission unit 315*a* communicates with each patterned piezoresistive sensitive unit 314.

S104: Etch the thermal oxide layer 313*a* located on the outer surface of the silicon substrate, to expose a structure of the transmission unit 315*a* fabricated in step S103 (refer to FIG. 10*d*).

The thermal oxide layer 313*a* is etched to form a protective layer 316 of a membrane 31, and the protective layer 316 has a via 315*b* formed through etching.

S105: Fill the via 315*b* and the outer surface of the protective layer 316 with metal through a deposition process, to form another part of the transmission unit 315*c* (refer to FIG. 10*e*).

The metal on the protective layer 316 forms a conductive structure layer outside the protective layer 316. The metal is connected, through the metal filled in the via 315*b*, to the part of the transmission unit 315*a* fabricated in step S103, so that the part of the transmission unit 315*c* fabricated in step S105 and the another part of the transmission unit 315*a* fabricated in step S103 together form a transmission unit 315. In this way, a strain signal in the piezoresistive sensitive unit 314 is led to an outside of the protective layer 316. Subsequently, the transmission unit 315 may be directly connected to a piezoresistive diaphragm chip 341, or may be connected to a diaphragm chip 341 through the transmission line 319.

In some embodiments, fabrication of the balancing hole 317 may be further completed in this step.

S106: Etch an outer surface of the other side of the silicon substrate through a deep reactive ion etching process, to remove a material of the silicon substrate until the another thermal oxide layer 313*b* is exposed (refer to FIG. 10*f*).

The etching of this part of the silicon substrate is center etching, and a material of a periphery of the silicon substrate is retained to form a back cavity 32 of the diaphragm apparatus 30. A material of the silicon substrate between the another thermal oxide layer 313*b* and the protective layer 316 forms a body 311 of the membrane 31.

S107: Remove, through a rinsing process, the part that is of the thermal oxide layer 313*b* and that is exposed in step S106 (refer to FIG. 10*g*).

A thermal oxide layer 313*b* remained after the rinsing process forms a barrier layer 313 of the membrane 31, and the barrier layer 313 is connected between the body 311 and the back cavity 32. In addition, after the thermal oxide layer 313*b* is partially removed, a first plane 311*a* of the body 311 is also exposed. The rinsing process may be performed by using a hydrofluoric acid (Hydrofluoric acid, HF) reagent.

S108: Fabricate a reflection unit 312 on the first plane 311*a* through an evaporation process (refer to FIG. 10*h*).

The reflection unit 312 may be made of aluminum or an aluminum alloy.

In this way, the diaphragm apparatus 30 provided in this embodiment of this application can be fabricated, and implementation of positions of each component and each layer structure and functions of each component and each layer structure is ensured.

Figure 11:
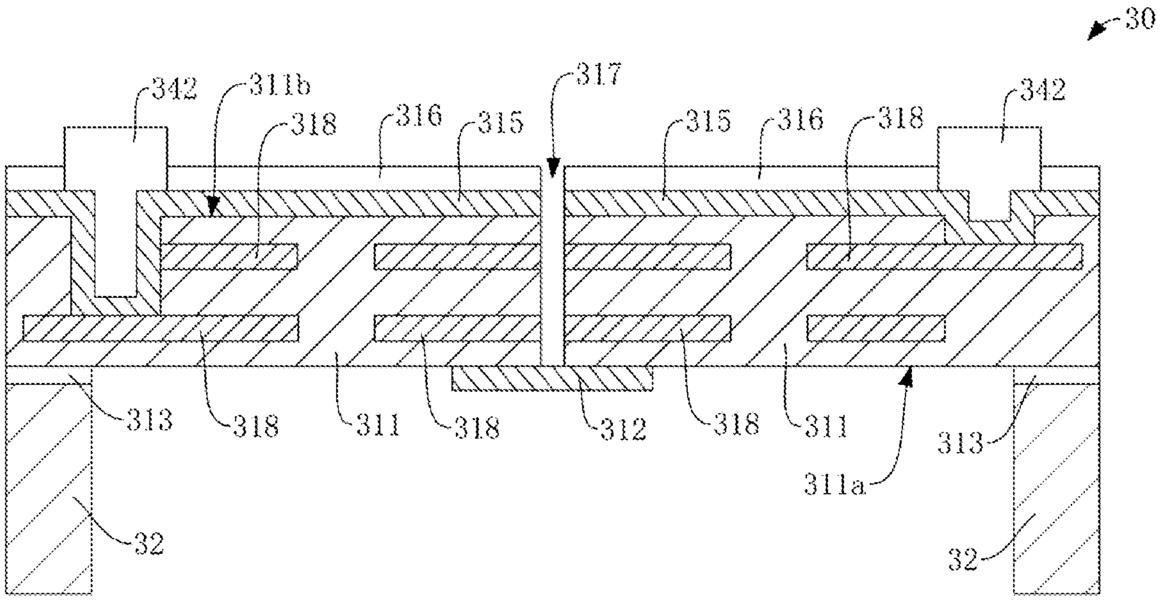
FIG. 11 is a schematic sectional view of another embodiment of a partial structure of a diaphragm apparatus in a microphone according to this application.

FIG. 11 shows another implementation of a structure of the diaphragm apparatus 30. In the implementation in FIG. 11, the membrane 31 is implemented by a piezoelectric membrane. Specifically, the membrane 31 also includes a body 311, a reflection unit 312, a barrier layer 313, transmission units 315, and a protective layer 316. The body 311 is made of a piezoelectric material. The entire body 311 is also in a shape of a thin film, and the body 311 has a first plane 311*a* and a second plane 311*b* that face away from each other. The first plane 311*a* is an outer surface of a side that is of the body 311 and that faces the substrate 10. The second plane 311*b* is an outer surface of a side that is of the body 311 and that is away from the substrate 10. The barrier layer 313 is connected between the body 311 and a back cavity 32. The reflection unit 312 is also located on the first plane 311*a*. The protective layer 316 is located on a side of the second plane 311*b*, and is configured to protect the body 311 and remaining composition structures of the membrane 31.

In this embodiment, metal layers 318 and the transmission units 315 are disposed in a thickness direction of the body 311, and are located between the first plane 311*a* and the second plane 311*b* of the body 311. There may be one or more metal layers 318. FIG. 11 shows two metal layers 318. The transmission units 315 are electrically connected to the metal layers 318 respectively, and the transmission units 315 further partially extend out of the second plane 311*b*. In this embodiment, the protective layer 316 is further located on one side that is of the transmission unit 315 and that faces away from the reflection unit 312, and is configured to: cover and protect the transmission units 315 that extend out of the second plane 311*b*.

After an external sound vibration is transmitted to a sound pickup cavity 33 through a sound pickup hole 11, the body 311 is excited by the external sound vibration to generate vibration displacement. The body 311 made of the piezoelectric material may form a charge. The metal layer 318 disposed in the body 311 collects the charge, forms a charge signal, and transfers the charge signal backward through the transmission unit 315 connected to the metal layer 318. Further, the membrane 31 is correspondingly provided with a piezoelectric diaphragm chip 342. The piezoelectric diaphragm chip 342 may be disposed on the diaphragm apparatus 30, or may be integrated into the processing unit 40. The piezoelectric diaphragm chip 342 is electrically connected to the transmission unit 315, and is configured to: convert the charge signal collected by the metal layer 318 into a second voltage signal V2, and transmit the second voltage signal V2 to the processing unit 40.

It may be understood that, dimensions of the body 311, the reflection unit 312, the protective layer 316, the piezoelectric diaphragm chip 342, and the like inside the diaphragm apparatus 30 implemented by the piezoelectric diaphragm shown in FIG. 11, an embodiment of a balancing hole 317, and the like may be all specified with reference to the foregoing piezoresistive diaphragm apparatus 30, to improve sensitivity of the diaphragm apparatus 30. Therefore, embodiments in which the diaphragm apparatus 30 according to this application that is implemented by the piezoresistive membrane or the piezoelectric membrane can also implement reliable capturing of an external sound vibration.

Figure 6:
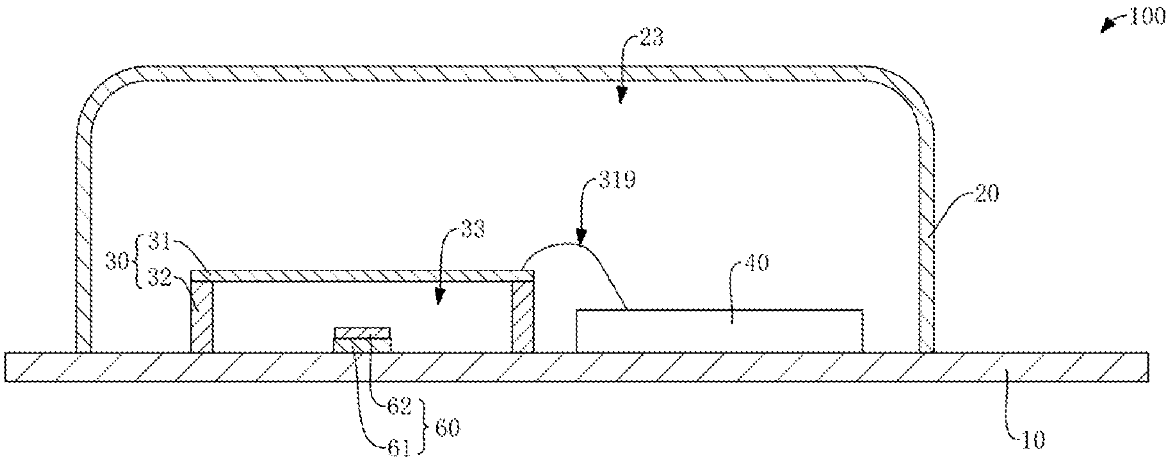
FIG. 6 is a schematic sectional view of a structure of an inner cavity in a microphone according to this application.
Figure 7:
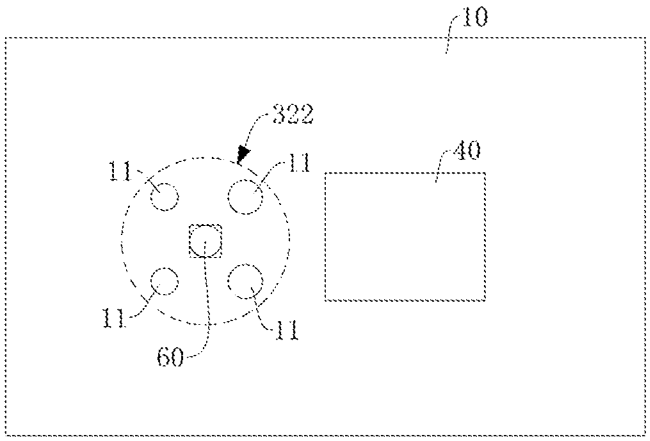
FIG. 7 is a schematic plan view of a structure of a sound pickup cavity in a microphone according to this application.

Refer to FIG. 5, FIG. 6, and FIG. 7. The microphone 100 according to this application further includes a laser self-mixing apparatus 60. The laser self-mixing apparatus 60 is accommodated in the sound pickup cavity 33, and includes a transmitter 61 and a receiver 62. The transmitter 61 and the receiver 62 are both fastened relative to the substrate 10. The transmitter 61 may be a vertical-cavity surface-emitting laser (Vertical-Cavity Surface-Emitting Laser, VCSEL), and is configured to emit laser light toward the reflection unit 312. The receiver 62 is configured to receive laser light reflected by the reflection unit 312. The laser light emitted by the transmitter 61 and the laser light reflected by the reflection unit 312 may be both diffracted in the sound pickup cavity 33. Diffracted laser light further hits the first plane 311*a* of the membrane 31 and an inner wall of the back cavity 32, and is partially received by the receiver 62 after being reflected. Further, a vibration of the membrane 31 also causes a part of the laser light to be reflected to the inner wall of the back cavity 32. When an external sound vibration causes the membrane 31 to vibrate, the foregoing laser light reflected by the reflection unit 312 may carry vibration information of the membrane 31. The laser light may be mixed with the laser light reflected by the inner wall of the back cavity 32, to form self-mixing effect in the sound pickup cavity 33. Intensity and a frequency of a self-mixed laser light beam may change, and changed intensity and a changed frequency also carry the vibration information of the membrane 31. After receiving a laser signal obtained through mixing, the receiver 62 may compare the laser light emitted by the transmitter 61 with the laser light obtained through mixing, extract a current signal (specifically, a first current signal A1), convert the current signal into a voltage signal (specifically, a first voltage signal V1), and transmit the voltage signal to the processing unit 40.

As shown in FIG. 6 and FIG. 7, the transmitter 61 and the receiver 62 are further disposed in an overlapping manner, the transmitter 61 is fastened to the substrate 10, and the receiver 62 is located on a side that is of the transmitter 61 and that faces away from the substrate 10. Further, the membrane 31 is disposed in parallel to the substrate 10, and the first plane 311*a* of the membrane 31 is perpendicular to both the transmitter 61 and the receiver 62. Therefore, the reflection unit 312 is also disposed perpendicular to the transmitter 61 and the receiver 62. In addition, the transmitter 61 and the receiver 62 on the substrate 10 are located within a projection range of the reflection unit 312 on the substrate 10. In this case, the transmitter 61 emits laser light toward the membrane 31 in a direction perpendicular to the substrate 10, and the laser light is received by the receiver 62 after being vertically reflected by the reflection unit 312, so that a flight distance of the laser light in the sound pickup cavity 33 can be shortened.

For the microphone 100 according to this application, the sound pickup cavity 33 may be defined as a front cavity of the microphone 100, and a distance between the membrane 31 and the substrate 10 is defined as a height of the front cavity. Space of the inner cavity 23 excluding space of the sound pickup cavity 33 is defined as a rear cavity of the microphone 100. A height of the membrane 31 relative to an inner surface of the protective plate 21 is defined as a height of the rear cavity. In an embodiment, a distance H between the reflection unit 312 and the transmitter 61 is limited to meet a condition: 20 um≤H≤100 um. Due to the limitation, a distance between the transmitter 61 and the membrane 31 is controlled. In addition, because the distance between the transmitter 61 and the membrane 31 is limited, the flight distance of the laser light in the sound pickup cavity 33 is controlled, so that a signal-to-noise ratio (Signal-to-Noise Ratio, SNR) of the laser signal obtained by the receiver 62 is decreased.

Because the transmitter 61 is fastened to the substrate 10, the distance between the transmitter 61 and the reflection unit 312 is controlled, and the distance between the substrate 10 and the membrane 31 is also controlled. That is, the height of the front cavity of the microphone 100 is controlled through the foregoing limitation. On a premise that space and the height of the inner cavity 23 are fixed, controlling the height of the front cavity of the microphone 100 means increasing the height of the rear cavity of the microphone 100. A greater height of the rear cavity also helps increase a signal-to-noise ratio of the diaphragm apparatus 30. Further, in the foregoing embodiments of the membrane 31, the body 311 is merely of a one-layer or two-layer structure, but the microphone 100 can reach a relatively good operating state. Compared with a membrane of a multi-layer structure in the conventional technologies, the membrane 31 in this application is thinner, and obtained space of the rear cavity is correspondingly larger. This helps improve the signal-to-noise ratio of the diaphragm apparatus 30.

Therefore, in addition to capturing the external sound vibration by using the diaphragm apparatus 30, the microphone 100 according to this application may further capture the external sound vibration by using the laser self-mixing apparatus 60. The two sound vibration capturing manners may complement each other, or a manner such as a fusion algorithm may be used, to ensure that the microphone 100 can achieve better sound capturing effect. In addition, an audio capturing capability of the electronic device 200 that uses the microphone 100 according to this application is also improved because the microphone 100 has better sound capturing effect.

Figure 12:
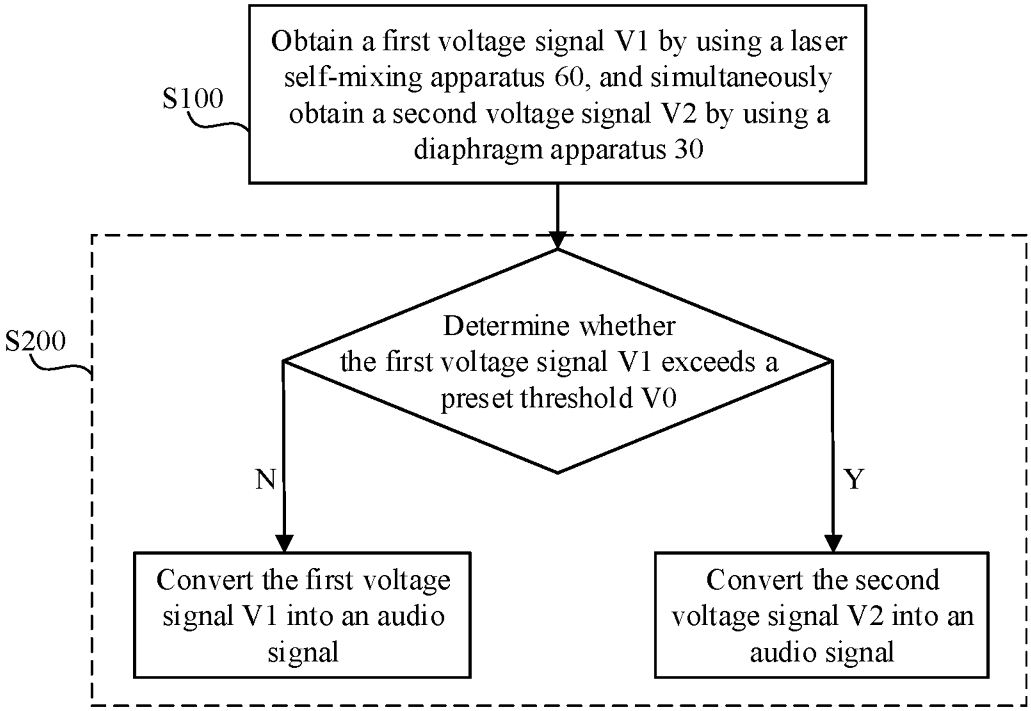
FIG. 12 is a flowchart of a sound capturing method according to this application.

FIG. 12 shows a sound capturing method according to this application. The method includes the following steps:

S100: Obtain a first voltage signal V1 by using a laser self-mixing apparatus 60, and simultaneously obtain a second voltage signal V2 by using a diaphragm apparatus 30.

S200: If the first voltage signal V1 is less than or equal to a preset threshold V0, convert the first voltage signal V1 into an audio signal; or if the first voltage signal V1 is greater than the preset threshold V0, convert the second voltage signal V2 into an audio signal.

It may be understood that the sound capturing method according to this application is based on the foregoing microphone 100 that includes both the laser self-mixing apparatus 60 and the diaphragm apparatus 30. Specifically, during step S100, when an external sound vibration occurs, a sound wave is transmitted to the sound pickup cavity 33 through the sound pickup hole 11, and causes the membrane 31 to vibrate. In this case, the diaphragm apparatus 30 may sense the vibration of the membrane 31, sense displacement of the membrane 31 in a piezoelectric or piezoresistive manner, form the second voltage signal V2, and transmit the second voltage signal V2 to the processing unit 40. At the same time, the laser self-mixing apparatus 60 monitors the vibration of the membrane 31, forms the first voltage signal V1, and transmits the first voltage signal V1 to the processing unit 40. In this case, the two voltage signals obtained by the processing unit 40 are formed based on a same external sound vibration. To be specific, a sound vibration captured by the laser self-mixing apparatus 60 and a sound vibration captured by the diaphragm apparatus 30 are a sound vibration in a same environment, and the first voltage signal V1 and the second voltage signal V2 are both used to reflect the sound vibration in the same environment.

After separately obtaining the first voltage signal V1 and the second voltage signal V2, the processing unit 40 determines a magnitude of the first voltage signal V1 based on the preset threshold V0. To be specific, the processing unit 40 may compare the first voltage signal V1 with the preset threshold V0, and process the first voltage signal V1 or the second voltage signal V2 based on a comparison result. Specifically, when the first voltage signal V1 is less than or equal to the preset threshold V0, the processing unit 40 chooses to process the first voltage signal V1, and converts the first voltage signal V1 into an audio signal that is output backward; or when the first voltage signal V1 is greater than the preset threshold V0, the processing unit 40 chooses to process the second voltage signal V2, and converts the second voltage signal V2 into an audio signal that is output backward.

Because the laser self-mixing apparatus 60 and the diaphragm apparatus 30 are different in sound capturing principles, the two apparatuses also have different advantages in sound capturing. The laser self-mixing apparatus 60 is more sensitive, and may be configured to collect a sound vibration signal with relatively low sound vibration energy and relatively low sound pressure. However, in a scenario of relatively high sound vibration energy and high sound pressure, noise of the laser self-mixing apparatus 60 increases, a signal-to-noise ratio decreases, and an acoustic overload point (Acoustic Overload Point, AOP) of the laser self-mixing apparatus 60 is relatively low. Consequently, an overall sound recognition capability is compromised. By contrast, the diaphragm apparatus 30 has a better recognition capability in a scenario of relatively high sound pressure, can control a signal-to-noise ratio of a signal, and has a higher acoustic overload point.

The energy of the external sound vibration may be identified based on a magnitude of sound pressure. For the microphone 100 according to this application, identification and differentiation may be performed based on the magnitude of the collected first voltage signal V1 or a magnitude of the collected second voltage signal V2. In the sound capturing method in this application, the preset threshold V0 may be set to control the microphone 100 to capture a sound vibration in a scenario of relatively low sound pressure by using the laser self-mixing apparatus 60, so that sensitivity of the microphone 100 is improved and an operating range of the microphone 100 is expanded. In a scenario of relatively high sound pressure, the microphone 100 according to this application captures a sound vibration by using the diaphragm apparatus 30, to ensure a signal-to-noise ratio of a signal and improve an acoustic overload point of the microphone 100.

Further, because the first voltage signal V1 and the second voltage signal V2 are both used to reflect the sound vibration in the same environment, the first voltage signal V1 and the second voltage signal V2 may be considered synchronous in time. When the processing unit 40 switches from processing the first voltage signal V1 to processing the second voltage signal V2, or switches from processing the second voltage signal V2 to processing the first voltage signal V1, because of a time synchronization feature of the two signals, signal out-of-synchronization or a frame loss does not occur. This ensures that the microphone 100 can continuously capture external sound vibrations and convert the external sound vibrations to obtain continuous audio signals.

In addition, based on different structures of the membrane 31 and the back cavity 32 in the diaphragm apparatus 30 and different selections of the transmitter 61 and the receiver 62 in the laser self-mixing apparatus 60, the preset threshold V0 in the sound capturing method in this application is not specified to be a unique value. In some embodiments, the preset threshold V0 may be set to 0.1 V. To be specific, when the magnitude of the first voltage signal V1 collected by the laser self-mixing apparatus 60 is less than or equal to 0.1 V, the processing unit 40 processes the first voltage signal V1 into the audio signal; or when the magnitude of the first voltage signal V1 is greater than 0.1 V, the processing unit 40 processes the second voltage signal V2 into the audio signal. However, in some other embodiments, the preset threshold may be alternatively defined as a voltage value that is formed when the laser self-mixing apparatus 60 collects an audio signal corresponding to 94 dB to 100 dB. This may also ensure that the laser self-mixing apparatus 60 and the diaphragm apparatus 30 capture sound vibrations in respective operating (that is, sound pressure) scenarios that are more desirable.

It may be understood that, in the foregoing embodiment, the preset threshold V0 may be a specific value, or may be a value range. There are some overlaps between desirable operating scenarios of the diaphragm apparatus 30 and the laser self-mixing apparatus 60. In other words, in cases of the overlaps (namely, ranges of sound pressure), the diaphragm apparatus 30 and the laser self-mixing apparatus 60 can both achieve relatively good sound vibration capturing effect.

In some embodiments, after the preset threshold V0 is set to a value range, specific setting may be further performed on a signal switching manner of the processing unit 40. For example, when the processing unit 40 converts the first voltage signal V1 into the audio signal, if the first voltage signal V1 does not exceed an upper limit of the preset threshold V0, the processing unit 40 may be controlled to continuously convert the first voltage signal V1 to the audio signal. This ensures audio signal continuity. Alternatively, when the processing unit 40 converts the second voltage signal V2 into the audio signal, if the first voltage signal V1 is not less than a lower limit of the preset threshold V0, the processing unit 40 may be controlled to continuously convert the second voltage signal V2 into the audio signal. This can also ensure audio signal continuity. In addition, the method in this embodiment also avoids signal out-of-synchronization or a frame loss that may be caused due to the processing unit 40 frequently switching a signal processing line of the processing unit 40.

In an embodiment, the "obtaining a first voltage signal V1 by using a laser self-mixing apparatus 60" in step S100 may include the following substeps:

S110: Control the transmitter 61 to emit laser light toward the membrane 31.

S120: Receive, by using the receiver 62, laser light reflected by the membrane 31, and form a first current signal A1.

S130: Modulate the first current signal A1 into the first voltage signal V1.

As mentioned above, after the receiver 62 of the laser self-mixing apparatus 60 receives the reflected laser light, a signal generated through sensing is a current signal (namely, the first current signal A1). However, the preset threshold V0 in the method according to this application is a voltage signal. Therefore, the first current signal A1 needs to be modulated first and converted into the first voltage signal V1, and then the processing unit 40 can compare the first voltage signal V1 with the preset threshold V0 for determining. In some embodiments, a laser signal received by the receiver 62 may be a laser light beam formed through self-mixing in the sound pickup cavity 33.

Further, in an embodiment, the "modulating the first current signal A1 into the first voltage signal V1" in step S130 further includes the following substeps:

S131: Convert the first current signal A1 into a first modulated voltage signal VT1 by using a transimpedance amplifier.

S132: Amplify the first modulated voltage signal VT1 by using an operational amplifier.

S133: Perform filtering on an amplified first modulated voltage signal VT1 to form the first voltage signal V1.

Figure 13:
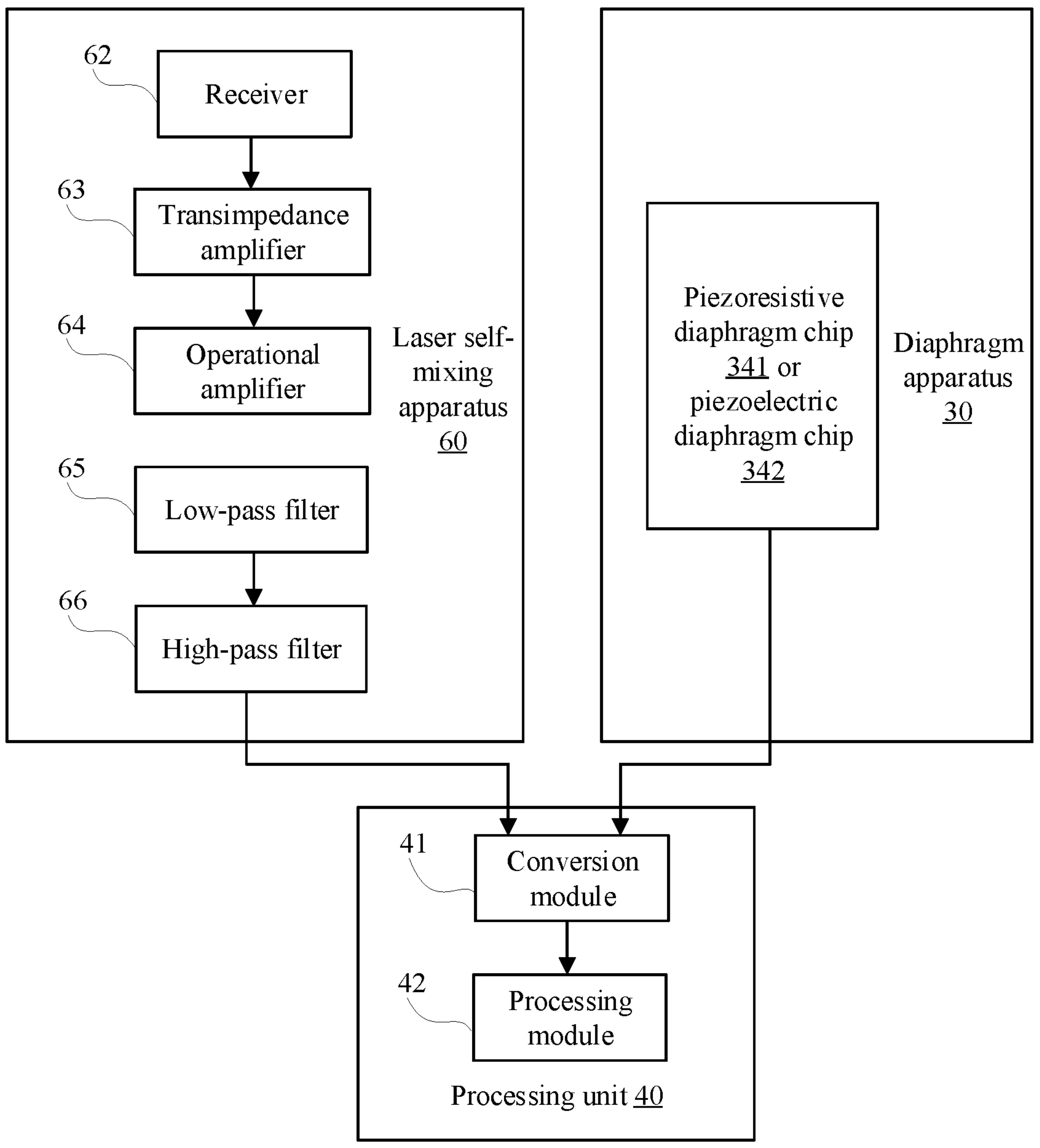
FIG. 13 is a circuit diagram of signal processing in a microphone according to this application.

For details, refer to FIG. 13. FIG. 13 is a circuit diagram of signal processing in a microphone 100 according to this application. In this embodiment, the laser self-mixing apparatus 60 is further provided with a transimpedance amplifier 63, an operational amplifier 64, a low-pass filter 65, and a high-pass filter 66 are further disposed in the laser self-mixing apparatus 60. The transimpedance amplifier 63 is electrically connected to the receiver 62, and the transimpedance amplifier 63 is configured to convert the first current signal A1 into the first modulated voltage signal VT1. The operational amplifier 64 is electrically connected to the transimpedance amplifier 63, and the operational amplifier 64 is configured to amplify the first modulated voltage signal VT1, to increase strength of the first modulated voltage signal VT1, so that the amplified first modulated voltage signal VT1 can meet a data processing requirement of the processing unit 40. The low-pass filter 65 and the high-pass filter 66 are successively connected to the operational amplifier 64, and are configured to respectively perform low-pass filtering and high-pass filtering on the amplified first modulated voltage signal VT1 to form the first voltage signal V1.

A range of audio frequencies that can be received by a human ear is limited, and after conversion into the audio signal, a part of vibration information carried in the first modulated voltage signal VT1 is beyond the range of audio frequencies that can be received by the human ear. Therefore, after filtering is performed on the amplified first modulated voltage signal VT1, the part of vibration information beyond the range of audio frequencies that can be received by the human ear can be filtered out. The first voltage signal V1 formed after filtering is performed on the amplified first modulated voltage signal VT1 retains only vibration information within the range of audio frequencies that can be received by the human ear. This can reduce workload of the processing unit 40.

For the diaphragm apparatus 30, in an embodiment, the "obtaining a second voltage signal V2 by using a diaphragm apparatus 30" in step S100 may include the following substeps:

S140: Collect, by using a diaphragm chip, a strain signal formed by displacement of the membrane 31.

S150: Convert the strain signal into the second voltage signal V2.

Based on the foregoing descriptions of the solutions of the diaphragm apparatus 30, in a process of capturing the external sound vibration, the diaphragm apparatus 30 according to this application needs to sense the vibration of the membrane 31 by using the diaphragm chip, convert the displacement of the membrane 31 into the strain signal, and form the second voltage signal V2 based on the strain signal. The diaphragm chip may be the piezoresistive diaphragm chip 341, or may be the piezoelectric diaphragm chip 342. When the diaphragm chip is the piezoelectric diaphragm chip 342, a strain signal of the piezoelectric diaphragm chip 342 is specifically a charge signal, namely, a collected charge that is generated due to deformation of the body 311 made of the piezoelectric material during vibration. In this case, the charge signal is converted into the second voltage signal V2.

Figure 14:
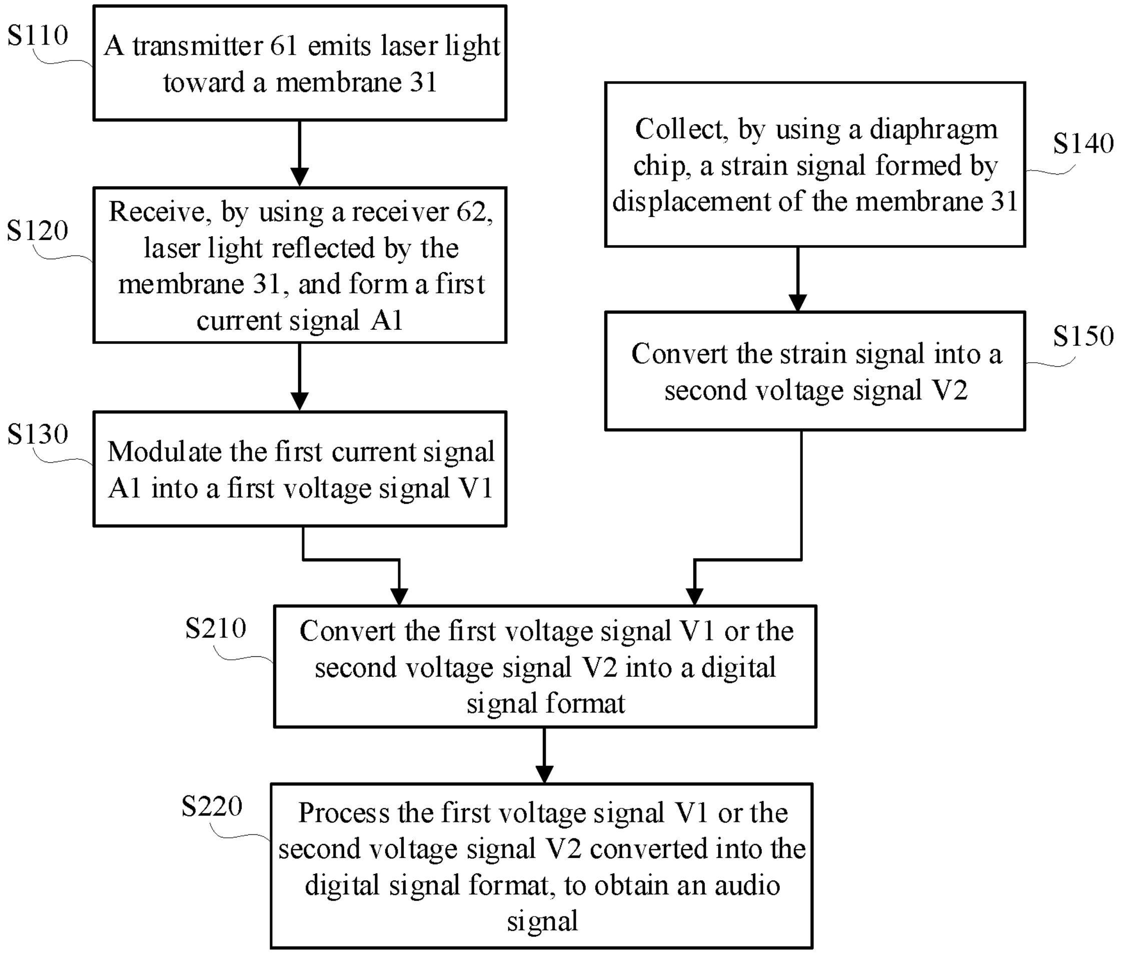
FIG. 14 is a flowchart of another embodiment of a sound capturing method according to this application.

It should be noted that, an operating process, in substeps S110 to S130, in which the laser self-mixing apparatus 60 operates to form the first voltage signal V1 and an operating process, in substeps S140 and S150, in which the diaphragm apparatus 30 operates to form the second voltage signal V2 are operations completed by two different processing circuits separately operating and synchronously running. A sequence of the foregoing sequence numbers does not represent a specific sequence of the operating processes of the microphone 100, and the two operating processes are actually in a parallel relationship. For details, refer to FIG. 14. FIG. 14 is another schematic flowchart of a sound capturing method according to this application.

In an embodiment, based on the examples in FIG. 13 and FIG. 14, in this application, the "converting the first voltage signal V1 or the second voltage signal V2 into an audio signal" in step S200 may further include the following substeps:

S210: Convert the first voltage signal V1 or the second voltage signal V2 into a digital signal format.

S220: Perform algorithm processing on the first voltage signal V1 or the second voltage signal V2 converted into the digital signal format, to obtain the audio signal.

Specifically, in this embodiment, the processing unit 40 includes a conversion module 41 and a processing module 42. The first voltage signal V1 that is input from the laser self-mixing apparatus 60 is in an analog signal format, and the second voltage signal V2 that is input from the diaphragm apparatus 30 is also in the analog signal format. When the processing module 42 processes the first voltage signal V1 or the second voltage signal V2, digital conversion needs to be first performed on the first voltage signal V1 and the second voltage signal V2 by using the conversion module 41. After the first voltage signal V1 and the second voltage signal V2 are converted from analog signals into digital signals, the conversion module 41 transmits the first voltage signal V1 and the second voltage signal V2 that are in the digital signal format to the processing module 42, and the processing module 42 processes the first voltage signal V1 and the second voltage signal V2 that are in the digital signal format into the audio signals.

Figure 15:
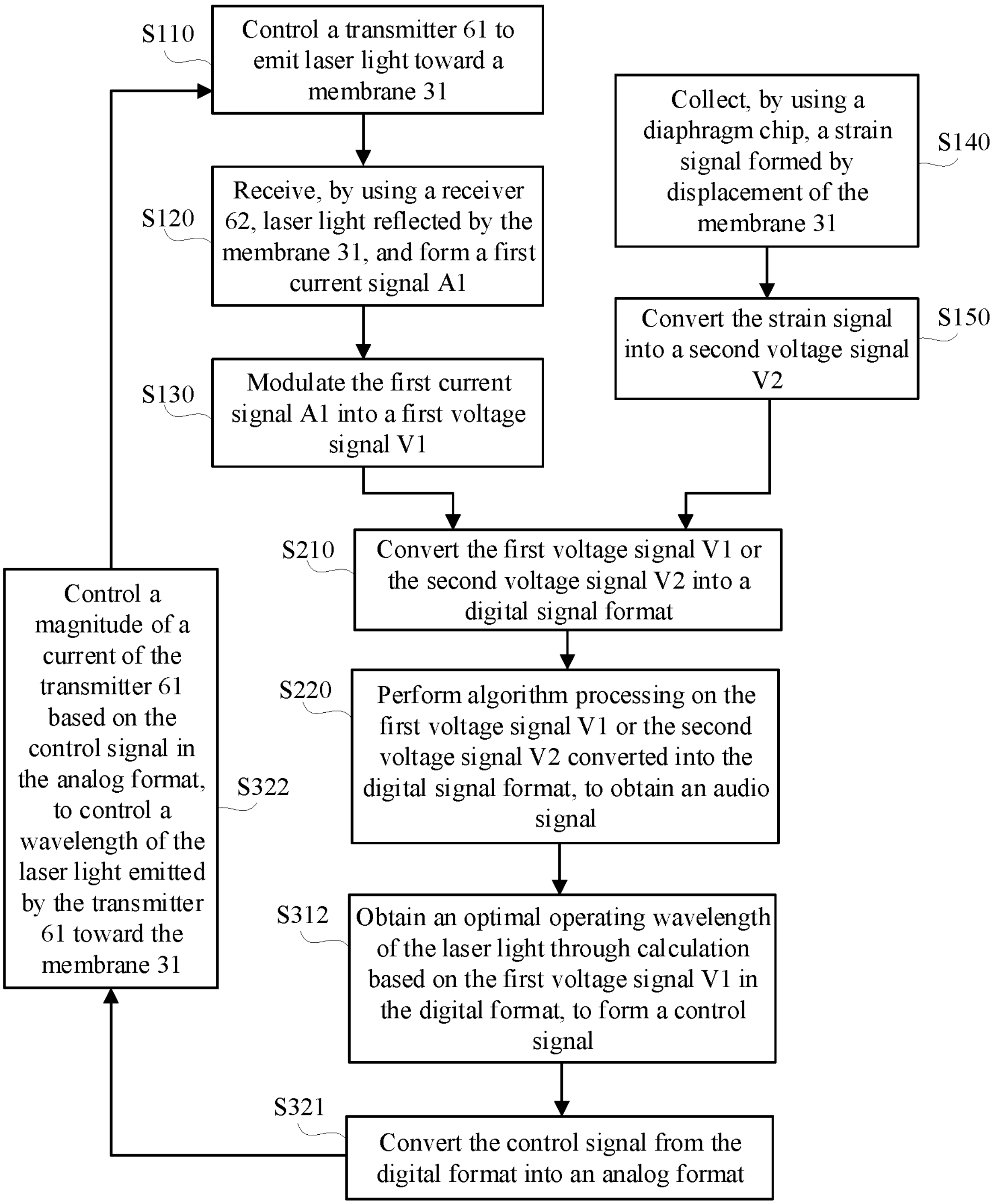
FIG. 15 is a flowchart of still another embodiment of a sound capturing method according to this application.
Figure 16:
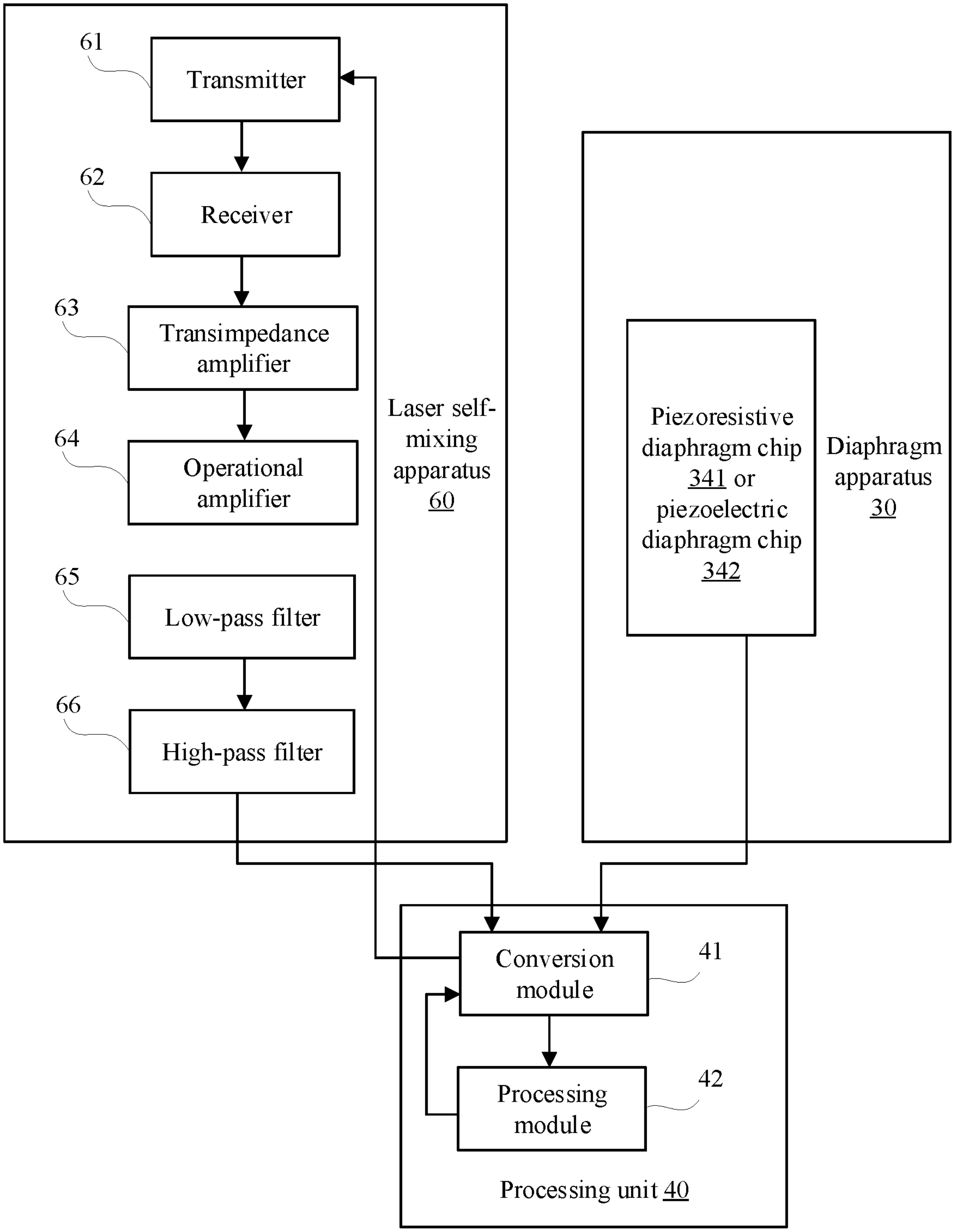
FIG. 16 is a circuit diagram of another embodiment of signal processing in a microphone according to this application.

Refer to FIG. 15. FIG. 15 is a flowchart of still another embodiment of a sound capturing method according to this application. Also refer to FIG. 16. FIG. 16 is a circuit diagram corresponding to the flowchart. After the "obtaining a first voltage signal V1 by using a laser self-mixing apparatus 60" in step S100, the method may further include:

S300: Form a control signal based on the first voltage signal V1, and output the control signal to the transmitter 61 to adjust a wavelength of the laser light emitted toward the membrane 31.

Specifically, the external sound vibration changes, and correspondingly, an optimal operating point (or described as optimal operating intensity and an optimal operating frequency of the laser light) of the laser self-mixing apparatus 60 may change in a process in which the laser self-mixing apparatus 60 collects the first voltage signal V1. Based on different magnitudes of the first voltage signal V1, a processing unit 40 may obtain a current optimal operating point of the laser self-mixing apparatus 60 through calculation based on a phase-locked loop algorithm or the like. In this case, the processing unit 40 may synchronously parse out a wavelength of laser light emitted by the laser self-mixing apparatus 60 when the laser self-mixing apparatus 60 operates at the optimal operating point. The processing unit 40 controls an operating current of the transmitter 61, so that the wavelength of the laser light emitted by the laser self-mixing apparatus 60 can be controlled. This ensures that the laser self-mixing apparatus 60 always collects the first voltage signal V1 at the optimal operating point.

In an embodiment, the "adjusting, based on the first voltage signal V1 and the phase-locked loop algorithm, the wavelength of the laser light emitted by the transmitter 61 toward the membrane 31" in step S300 may further include the following substeps:

S310: Obtain an optimal operating wavelength of the laser light through calculation based on the first voltage signal V1, to form the control signal.

S320: Control a magnitude of an operating current of the transmitter 61 based on the control signal, to control the wavelength of the laser light emitted toward the membrane 31.

Specifically, step S310 may further include the following substeps:

S311: Convert the first voltage signal V1 from the analog format into the digital format.

S312: Obtain the optimal operating wavelength of the laser light through calculation based on the first voltage signal V1 in the digital format, to form the control signal.

Step S320 may include the following substeps:

S321: Convert the control signal from the digital format into the analog format.

S322: Control the magnitude of the operating current of the transmitter 61 based on the control signal in the analog format, to control the wavelength of the laser light emitted by the transmitter 61 toward the membrane 31.

Specifically, as mentioned above, the processing unit 40 includes the processing module 42. The optimal operating point of the laser self-mixing apparatus 60 is calculated by the processing module 42 based on the first voltage signal V1 in the digital signal format. Therefore, before the optimal operating wavelength of the laser light is obtained through calculation, the conversion module 41 further needs to perform digital format conversion on the first voltage signal V1 in the analog format. After completing calculation, the processing module 42 further needs to return a calculation result to the conversion module 41, and the calculation result is converted by the conversion module 41, from the digital format into an analog control signal in the analog signal format. Then, the transmitter 61 receives the analog control signal and controls the magnitude of the operating current, to control the wavelength of the laser light emitted by the transmitter 61.

In FIG. 15, the "converting the first voltage signal V1 from the analog format into the digital format" in step S310 may be implemented through the "converting the first voltage signal V1 or the second voltage signal V2 into a digital signal format" in step S210.

In an embodiment, the method according to this application may further include:

setting a feedback intensity C of the laser self-mixing apparatus 60 to be less than 1.

Specifically, in this embodiment, the feedback intensity of the laser self-mixing apparatus 60 may be understood as changes, relative to intensity and a frequency of the originally emitted laser light, of intensity and a frequency of laser light obtained by the laser light transmitted by the transmitter 61 being self-mixed in a sound pickup cavity, combining a propagation medium gain and a light loss, and experiencing phase superposition. The feedback intensity is related to a height of a front cavity of the microphone 100, a reflectivity of the reflection unit 312, a line width of a laser, a frequency of the laser light, a height of a resonance cavity of the laser self-mixing apparatus 60, and the like. When the feedback intensity C>1, a light signal received by the receiver 62 may experience a phase change and may be accompanied by high phase noise. When the feedback intensity C=1, a phase jump and phase noise of a strain signal correspondingly decrease. When the feedback intensity C<1, a phase jump does not occur in a light signal received by the receiver 62, and phase noise is relatively low. Therefore, in this embodiment, the feedback intensity of the laser self-mixing apparatus 60 is controlled, so that quality of the laser signal received by the receiver 62 can be ensured.

The foregoing descriptions are merely specific embodiments of this application, but are not intended to limit the protection scope of this application. Any variation or replacement readily figured out by a person skilled in the art within the technical scope disclosed in this application, for example, removing or adding a structural member and changing a shape of the structural member shall fall within the protection scope of this application. Embodiments of this application and the features in the embodiments can be combined with each other provided that there is no conflict. Therefore, the protection scope of this application should be subject to the protection scope of the claims.

What is claimed is:

1. A sound capturing method performed by a microphone, wherein the microphone comprises a substrate, a protective cover, a laser self-mixing apparatus and a diaphragm apparatus, wherein the protective cover and a processor are fastened to the substrate, the protective cover and the substrate form an inner cavity through enclosure, the diaphragm apparatus comprises a membrane and a back cavity, the back cavity is fastened to the substrate, the membrane is located on a side of the back cavity and away from the substrate, and the membrane and the back cavity form a sound pickup cavity through enclosure on the substrate, the membrane is configured to respond to a sound vibration, and the laser self-mixing apparatus and the diaphragm apparatus are fastened in the inner cavity and each are communicatively connected to the processor and are separately configured to detect a vibration of the membrane, wherein the laser self-mixing apparatus comprises a transmitter and a receiver, the transmitter and the receiver are both accommodated in the sound pickup cavity and fastened to the substrate, and wherein the substrate is further provided with a plurality of sound pickup holes, and the sound pickup cavity communicates with the outside through the plurality of sound pickup holes; and the method comprises:

simultaneously obtaining a first voltage signal by using the laser self-mixing apparatus and a second voltage signal by using the diaphragm apparatus;

determining whether the first voltage signal is less than or equal to a preset threshold; and in response to determining that the first voltage signal is less than or equal to a preset threshold, converting the first voltage signal into an audio signal; or in response to determining that the first voltage signal is greater than the preset threshold, converting the second voltage signal into an audio signal.

2. The sound capturing method according to claim 1, wherein the laser self-mixing apparatus comprises a transmitter and a receiver, and the obtaining a first voltage signal by using the laser self-mixing apparatus comprises:

controlling the transmitter to emit laser light toward the membrane;

receiving, by using the receiver, the laser light reflected by the membrane;

forming a first current signal; and modulating the first current signal into the first voltage signal.

3. The sound capturing method according to claim 2, wherein the laser self-mixing apparatus further comprises a transimpedance amplifier and an operational amplifier; and the modulating the first current signal into the first voltage signal comprises:

converting the first current signal into a first modulated voltage signal by using the transimpedance amplifier;

amplifying the first modulated voltage signal by using the operational amplifier; and performing filtering on an amplified first modulated voltage signal to form the first voltage signal.

4. The sound capturing method according to claim 1, wherein the diaphragm apparatus comprises a diaphragm chip, and wherein the obtaining a second voltage signal by using the diaphragm apparatus comprises:

collecting, by using the diaphragm chip, a strain signal formed by displacement of the membrane; and converting the strain signal into the second voltage signal.

5. The sound capturing method according to claim 1, further comprising:

forming a control signal based on the first voltage signal; and outputting the control signal to the transmitter to adjust a wavelength of a laser light emitted by the transmitter toward the membrane.

6. The sound capturing method according to claim 5, wherein the forming a control signal based on the first voltage signal and outputting the control signal to the transmitter to adjust a wavelength of the laser light emitted toward the membrane comprises:

obtaining an optimal operating wavelength of the laser light through calculation based on the first voltage signal to form the control signal; and controlling a magnitude of an operating current of the transmitter based on the control signal to control the wavelength of the laser light emitted toward the membrane.

7. The sound capturing method according to claim 1, wherein a feedback coefficient C of the laser self-mixing apparatus is less than 1.

8. A microphone, comprising a substrate, a protective cover, a laser self-mixing apparatus, a diaphragm apparatus, and a processor, wherein the protective cover and the processor are fastened to the substrate, the protective cover and the substrate form an inner cavity through enclosure, and the laser self-mixing apparatus and the diaphragm apparatus are fastened in the inner cavity and each are communicatively connected to the processor;

the diaphragm apparatus comprises a membrane and a back cavity, the back cavity is fastened to the substrate, the membrane is located on a side of the back cavity and away from the substrate, and the membrane and the back cavity form a sound pickup cavity through enclosure on the substrate;

the laser self-mixing apparatus comprises a transmitter and a receiver, the transmitter and the receiver are both accommodated in the sound pickup cavity and fastened to the substrate, the transmitter is configured to emit laser light toward the membrane, and the receiver is configured to receive laser light reflected by the membrane; and the substrate is further provided with a plurality of sound pickup holes, and the sound pickup cavity communicates with the outside through the plurality of sound pickup holes.

9. The microphone according to claim 8, wherein the membrane comprises a reflector, the reflector is located on a surface that is of the membrane and that faces the substrate, and the laser light emitted by the transmitter is received by the receiver after being reflected by the reflector.

10. The microphone according to claim 9, wherein the reflector is located in a geometric center of the membrane, and the transmitter and the receiver on the substrate are located within a projection region of the reflector on the substrate.

11. The microphone according to claim 8, wherein the diaphragm apparatus comprises a diaphragm chip, and the diaphragm chip is configured to:

detect a vibration of the membrane;

form a second voltage signal; and transmit the second voltage signal to the processor.

12. The microphone according to claim 11, wherein the membrane is a piezoelectric membrane or a piezoresistive membrane, and the diaphragm chip is a piezoelectric diaphragm chip or a piezoresistive diaphragm chip.

13. The microphone according to claim 8, wherein a thickness D of the membrane satisfies a condition: 0.1 μm≤D≤1 μm um.

14. The microphone according to claim 9, wherein a distance H between the reflector and the transmitter satisfies a condition: 20 μm≤H≤100 μm.

15. An electronic device, comprising a microphone, wherein the microphone is configured to collect an audio signal, wherein the microphone comprises a substrate, a protective cover, a laser self-mixing apparatus, a diaphragm apparatus, and a processor, wherein the protective cover and the processor are fastened to the substrate, the protective cover and the substrate form an inner cavity through enclosure, and the laser self-mixing apparatus and the diaphragm apparatus are fastened in the inner cavity and each are communicatively connected to the processor;

the diaphragm apparatus comprises a membrane and a back cavity, the back cavity is fastened to the substrate, the membrane is located on a side of the back cavity and away from the substrate, and the membrane and the back cavity form a sound pickup cavity through enclosure on the substrate;

the laser self-mixing apparatus comprises a transmitter and a receiver, the transmitter and the receiver are accommodated in the sound pickup cavity and fastened to the substrate, the transmitter is configured to emit laser light toward the membrane, and the receiver is configured to receive laser light reflected by the membrane; and the substrate is further provided with a plurality of sound pickup holes, and the sound pickup cavity communicates with the outside through the plurality of sound pickup holes.

16. The electronic device according to claim 15, wherein the membrane comprises a reflector, the reflector is located on a surface of the membrane and that faces the substrate, and the laser light emitted by the transmitter is received by the receiver after being reflected by the reflector.

17. The electronic device according to claim 16, wherein the reflector is located in a geometric center of the membrane, and the transmitter and the receiver on the substrate are located within a projection region of the reflector on the substrate.

18. The electronic device according to claim 15, wherein the diaphragm apparatus comprises a diaphragm chip, and the diaphragm chip is configured to:

detect a vibration of the membrane;

form a second voltage signal; and transmit the second voltage signal to the processor.

19. The electronic device according to claim 18, wherein the membrane is a piezoelectric membrane or a piezoresistive membrane, and the diaphragm chip is a piezoelectric diaphragm chip or a piezoresistive diaphragm chip.

20. The electronic device according to claim 16, wherein a thickness D of the membrane satisfies a condition: 0.1 μm≤D≤1 μm um, and a distance H between the reflector and the transmitter satisfies a condition: 20 μm≤H≤100 μm.

* * * * *